US012155316B2

(12) United States Patent
Guo et al.

(10) Patent No.: US 12,155,316 B2
(45) Date of Patent: Nov. 26, 2024

(54) CONTROL CIRCUIT FOR AN ISOLATED POWER SUPPLY

(71) Applicant: SHANGHAI BRIGHT POWER SEMICONDUCTOR CO., LTD, Shanghai (CN)

(72) Inventors: Yanmei Guo, Shanghai (CN); Zhen Zhu, Shanghai (CN); Yihui Chen, Shanghai (CN); Yuehui Li, Shanghai (CN); Xiaoru Gao, Shanghai (CN); Haifeng Miao, Shanghai (CN); Hanfei Yang, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 18/412,069

(22) Filed: Jan. 12, 2024

(65) Prior Publication Data

US 2024/0154537 A1 May 9, 2024

Related U.S. Application Data

(63) Continuation of application No. 17/550,659, filed on Dec. 14, 2021, now Pat. No. 11,929,684.

(30) Foreign Application Priority Data

Dec. 17, 2020 (CN) .......................... 202011496777.3

(51) Int. Cl.
*H02M 3/335* (2006.01)
*H02M 1/38* (2007.01)

(52) U.S. Cl.
CPC ......... *H02M 3/33592* (2013.01); *H02M 1/38* (2013.01)

(58) Field of Classification Search
CPC ........ H02M 1/38; H02M 1/385; H02M 3/335; H02M 3/33507; H02M 3/33592
See application file for complete search history.

(56) References Cited

U.S. PATENT DOCUMENTS 7,385,832 B2 6/2008 Allinder
9,374,011 B2 6/2016 Liu
(Continued)

FOREIGN PATENT DOCUMENTS

CN 106026712 A 10/2016
CN 208489798 U 2/2019
(Continued)

*Primary Examiner* — Fred E Finch, III
(74) *Attorney, Agent, or Firm* — MUNCY, GEISSLER, OLDS & LOWE, P.C.

(57) ABSTRACT

A control circuit for an isolated power supply is disclosed, the control circuit includes a secondary-side drive signal generator, a secondary-side transistor switch turn-off detector and a primary-side control signal generator. The primary-side control signal generator is configured to: determine a second turn-on instant referring to an turn-off instant of the secondary-side synchronous rectification transistor from the turn-off acknowledgement signal; determine a first turn-on instant referring to a supposed turn-on instant for the primary-side transistor switch from the feedback signal of the output voltage of the isolated power supply; and determine the turn-on instant for the primary-side transistor switch from the second turn-on instant or the first turn-on instant whichever is later, and responsively generate the primary-side transistor switch control signal. This control circuit can effectively avoid shoot-through of primary- and secondary-side transistor switches at the cost of only insignificantly compromised feedback adjustment accuracy.

14 Claims, 13 Drawing Sheets

(56) References Cited

U.S. PATENT DOCUMENTS

| | | |
|---|---|---|
| 10,560,012 B1 | 2/2020 | Yang |
| 10,812,077 B2 | 10/2020 | Lawson |
| 11,626,871 B2 | 4/2023 | Miletic |
| 2014/0204625 A1* | 7/2014 | Liu .................. H02M 3/33592 363/21.13 |
| 2017/0155335 A1* | 6/2017 | Chang .................... H02M 1/36 |
| 2017/0222569 A1* | 8/2017 | Choi ................ H02M 3/33592 |
| 2018/0358902 A1* | 12/2018 | Duvnjak ........... H02M 3/33592 |
| 2020/0169179 A1 | 5/2020 | Hara |

FOREIGN PATENT DOCUMENTS

| | | |
|---|---|---|
| CN | 110995013 A | 4/2020 |
| CN | 111355379 A | 6/2020 |
| CN | 111478589 A | 7/2020 |
| CN | 111541361 A | 8/2020 |
| WO | WO-2010083511 A1 | 7/2010 |

\* cited by examiner

CONTROL CIRCUIT FOR AN ISOLATED POWER SUPPLY

CROSS-REFERENCE TO RELATED APPLICATIONS

This application is a continuation of U.S. patent application Ser. No. 17/550,659, filed Dec. 14, 2021, which in turn claims the priority of Chinese patent application number 202011496777.3, filed on Dec. 17, 2020, the entire contents of which are incorporated herein by reference.

TECHNICAL FIELD

The present invention relates to the field of electronic circuits, and particularly to control circuits for an isolated power supply.

BACKGROUND

Nowadays, with increasingly greater importance being attached to environmental protection and energy conservation, more and more stringent requirements are being placed on the efficiency of power supplies. For switched-mode power supplies, replacing the conventional flyback diodes with synchronous rectification transistor switches is an effective way to obtained increased efficiency. In control circuit design of such power supplies, special care must be taken to avoid simultaneous conduction of the synchronous rectification transistor switch and a primary-side transistor switch because such cross-conduction may create a serious risk of breakdown when in operation in a continuous inductor current mode (CCM). For non-isolated switched-mode power supplies, this would not be a challenge because it is typically easy to achieve synchronized control of the synchronous rectification transistor and the primary-side transistor switch. However, for isolated switched-mode power supplies, as the synchronous rectification transistor arranged on the secondary side and the primary-side transistor switch on the primary side are referenced to separate grounds, their control is challenging.

In order to overcome the cross-conduction issue, the following two approaches have been being employed for synchronous rectification transistor control.

The first approach is independent control in which the secondary-side synchronous rectification transistor is turned on or off independent of control logic of the primary-side transistor switch. Generally, a voltage of the secondary-side winding is detected to determine whether the primary-side transistor switch has been turned on, and if so, the secondary-side synchronous rectification transistor is turn off. This approach is advantageous mainly in high transportability and no need for coordination with a primary-side controller in the isolated switched-mode power supply and is disadvantageous principally in insufficient reliability and a remaining probability of cross-conduction due to some change in the load and input voltages, in which case it is often necessary to limit a current accompanying the cross-conduction to avoid breakdown at the cost of reduced efficiency. Further, associated synchronous rectification control logic requires a detection circuit composed of multiple different signal detection features, which is sensitive and susceptible to interference.

The second approach is synchronous control in which a signal is transferred from the primary-side transistor switch to a controller for the secondary-side synchronous rectification transistor, and at the same time, a primary-side transistor switch control signal is delayed by a dead time and used to activate a primary-side power transistor. The primary-side transistor switch control signal turns off the synchronous rectification transistor, and the primary-side transistor switch is then turned on by the delayed control signal. This approach is advantageous mainly in simple control logic and higher reliability than the independent control approach. A main disadvantage of this approach is that the reliability of avoiding cross conduction by signal delaying is still suboptimal, and as an open-loop control method, the turning off of the synchronous rectification transistor takes same time, leaving a chance of cross conduction when the delay time is not properly designed. When to achieve highly reliable avoidance of cross conduction, the delay time must be largely extended, which may, however, exert an adverse effect on the power supply's feedback control accuracy. Moreover, in discontinuous current mode (DCM) operation of the power supply system, there is a zero-current interval, which can be used to distinguish a turn-off instant of the synchronous rectification transistor from a turn-on instant for the primary-side transistor switch, making it no longer necessary to set the delay time for avoiding cross conduction. In this case, the delaying of the primary-side transistor switch control signal becomes meaningless and unfavorable to power supply performance.

Therefore, in the field of isolated power supplies, there is an urgent need for a control approach capable of reliably overcoming the problem of cross conduction of a primary-side transistor switch and a synchronous rectification transistor while not compromising performance.

SUMMARY OF THE INVENTION

In order to solve the problem with the prior art that the avoidance of cross conduction of a primary-side transistor switch and a synchronous rectification transistor is achieved at the price of compromised feedback adjustment accuracy, transient response performance or efficiency, the present invention presents control circuits for an isolated power supply, an isolated power supply and a control method thereof.

According to the present invention, there is proposed a control circuit for an isolated power supply, which includes: a secondary-side drive signal generator configured to receive a signal characterizing a voltage of a secondary-side winding in the isolated power supply and generate a secondary-side transistor switch drive signal for turning on or off a secondary-side synchronous rectification transistor; a secondary-side transistor switch turn-off detector connected in a secondary side of the isolated power supply, the secondary-side transistor switch turn-off detector configured to produce a turn-off acknowledgement signal upon the secondary-side synchronous rectification transistor being turned off; and a primary-side control signal generator configured to receive the turn-off acknowledgement signal and a feedback signal of an output voltage of the isolated power supply and responsively generate a primary-side transistor switch control signal indicating a turn-on instant for a primary-side transistor switch, wherein the primary-side control signal generator is configured to: determine a second turn-on instant referring to an turn-off instant of the secondary-side synchronous rectification transistor from the turn-off acknowledgement signal; determine a first turn-on instant referring to a supposed turn-on instant for the primary-side transistor switch from the feedback signal of the output voltage of the isolated power supply; and determine the turn-on instant for the primary-side transistor switch from the second turn-on instant or the first turn-on instant whichever is later, and responsively generate the primary-side transistor switch control signal.

The proposed isolated power supply control circuits can independently determines the turn-off instant of the secondary-side synchronous rectification transistor without detecting whether the primary-side transistor switch is ON or not, and then takes the turn-off instant of the secondary-side synchronous rectification transistor as a basis for determining the actual turn-on instant for the primary-side transistor switch, achieving the purpose of avoiding shoot-through without delaying the primary-side transistor switch control signal. When there is no risk of shoot-through, a control feedback loop in the control circuit for the primary-side transistor switch may perform feedback control computation to choose to determine the actual turn-on instant for the primary-side transistor switch based on the supposed turn-on instant without any additional delaying processing. As a result, the anti-shoot-through design does not affect feedback response or circuit performance at all. Moreover, when there is a risk of shoot-through, the primary-side transistor switch may be turned on following the turning off of the secondary-side synchronous rectification transistor only when such a risk of shoot-through has been confirmed. This eliminates the possibility of shoot-through, and since the control circuit only precisely intervenes and modifies the turn-on instant for the primary-side transistor switch rarely in some periods found to be with a high risk of shoot-through, only exerting a limited impact on the feedback response performance.

BRIEF DESCRIPTION OF THE DRAWINGS

Throughout the following drawings, identical numerals indicate identical, analogous or features or corresponding functions.

DETAILED DESCRIPTION

Below, specific embodiments of the present invention will be described in detail. It is to be noted that the embodiments described herein are illustrative only and are not intended to limit the present invention. In the following description, numerous details are set forth so that a more thorough understanding of the present invention may be acquired. However, it would be apparent to one skilled in the art that the invention may be practiced without these specific details. In other instances, well-known circuits, materials or methods have not been described in order to avoid unnecessary obscuring of the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "in one example" or "in an example" in various places throughout this specification are not necessarily all referring to the same embodiment or example. Furthermore, the particular features, structures or characteristics may be combined in any suitable combinations and/or sub-combinations in one or more embodiments or examples.

In addition, it is appreciated that the figures provided herewith are for explanation purposes to persons ordinarily skilled in the art and that the drawings are not necessarily drawn to scale. It will be understood that when an element is referred to as being "connected to" or "coupled to" another element, it can be directly connected or coupled to the other element, or intervening elements may also be present. In contrast, when an element is referred to as being "directly connected to" or "directly coupled to" another element, there are no intervening elements present. The term "instant" refers to a particular time point, and the term "time" like "on-time" and "off-time" refers to a particular period of time. Throughout the drawings, like numerals indicate like elements. As used herein, the term "and/or" includes any and all combinations of one or more of the associated listed items.

It will be understood that although the terms "first", "second", "third", etc. may be used herein to describe various elements, these elements should not be limited by these terms. These terms are used only to distinguish one element from another element. Thus, a first element discussed below could be termed a second element without departing from the teachings of the present invention. As used herein, the term "and/or" includes any and all combinations of one or more of the associated listed items.

Figure 1:
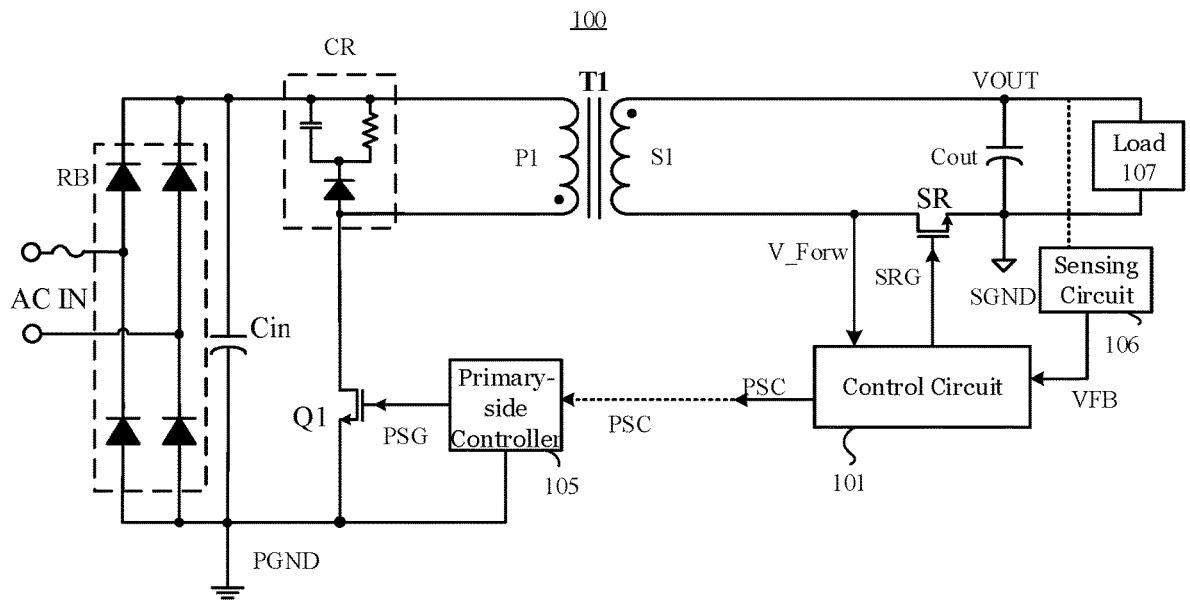
FIG. 1 shows a structural schematic diagram of an isolated power supply 100 according to an embodiment of the present invention.

FIG. 1 shows a structural schematic diagram of an isolated power supply 100 according to an embodiment of the present invention. As shown in FIG. 1, the isolated power supply adopts a flyback power supply topology including a primary side and a secondary side. The primary side includes a rectifier bridge RB having an input coupled to an external AC power source. In the illustrated embodiment, the primary side further includes a primary-side winding P1 of an isolation transformer T1 and a primary-side transistor switch Q1. The secondary side includes a secondary-side winding S1 of the isolation transformer T1 and a synchronous rectification transistor SR. The isolated power supply 100 may further include an input capacitor Cin and a snubber circuit CR both on the primary side, as well as an output filtering capacitor Cout and a load 107 both on the secondary side. The topological essence of such a flyback power supply is well known to those skilled in the art and therefore will not be described in further detail herein.

A control circuit 101 for the isolated power supply 100 that employs the flyback topology shown in FIG. 1 as an example will be described below. It is to be noted that although FIG. 1 shows the use of the control circuit 101 in an isolated power supply of a flyback topology, the present invention is not so limited, because it may also be suitably used in any other isolated power supply topology associated with a risk of cross conduction of a primary-side transistor switch and a synchronous rectification transistor, such as for example, single-ended forward, dual-switch forward, active clamp forward, resonant half-bridge LLC, resonant full-bridge LLC, phase-shifted full-bridge, etc., as would be appreciated by those of ordinary skill in the art.

As shown in FIG. 1, the control circuit 101 receives a feedback signal VFB of an output voltage Vout of the isolated power supply 100 and derives, from the feedback signal VFB, a supposed turn-on instant K1 for the primary-side transistor switch Q1. It also receives a voltage signal V_Forw from the secondary-side winding S1 of the isolated power supply 100 and derives, from the voltage signal V_Forw from the secondary-side winding S1, a turn-off instant K2 of the secondary-side synchronous rectification transistor SR. As used here and elsewhere herein, the phrase "supposed turn-on instant for the primary-side transistor switch" is intended to refer to an instant of time when the primary-side transistor switch is to be turned on determined according only to the feedback control loop design principles of the isolated power supply 100 from the output voltage feedback signal VFB as well as other possible feedback parameters like an output current feedback signal, an internal clock signal and/or a feedback loop compensation. The supposed turn-on instant K1 for the primary-side transistor switch Q1 may be "derived" by determining it directly from a generated signal that contains information of the supposed turn-on instant K1 or by performing a specific operation on time instant information contained in a signal, for example, by adding or subtracting a time bias to the time instant information. The "voltage of the secondary-side winding" is a voltage at a variable potential terminal of the secondary-side winding, which is a common terminal of the synchronous rectification transistor switch SR and the secondary-side winding S1. The "voltage signal from the secondary-side winding" is defined as a signal that characterizes the voltage of the secondary-side winding, for example, a signal divided from the voltage of the secondary-side winding through a voltage divider, or a signal directly sampled at the variable potential terminal of the secondary-side winding. The instants K1 and K2 are referred to each operational period of the respective transistor switches. There are multiple instants K1 and K2 within multiple such operational periods. In the embodiment shown in FIG. 1, the synchronous rectification transistor SR is connected between the secondary-side winding S1 and a secondary-side ground SGND so that the output voltage VOUT is directly provided at a dotted terminal of the secondary-side winding. As VOUT remains constant in steady-state operation, the dotted terminal is a fixed potential terminal. A non-dotted terminal of the secondary-side winding is connected to the synchronous rectification transistor SR, and the voltage of the secondary-side winding is present at the non-dotted terminal. In other embodiments, the synchronous rectification transistor SR may be alternatively connected between the secondary-side winding and an output of the isolated power supply 100, as shown in FIG. 1. In this case, the voltage of the secondary-side winding is present at the dotted terminal.

The control circuit 101 is further configured to derive an actual turn-on instant for the primary-side transistor switch Q1 from both the supposed turn-on instant K1 for the primary-side transistor switch Q1 and the turn-off instant K2 of the secondary-side synchronous rectification transistor and to generate a primary-side transistor switch control signal PSC. When the supposed turn-on instant K1 for the primary-side transistor switch is later than the turn-off instant K2 of the secondary-side synchronous rectification transistor, the actual turn-on instant for the primary-side transistor switch Q1 correspond to the supposed turn-on instant K1. When the supposed turn-on instant K1 for the primary-side transistor switch is earlier than the turn-off instant K2 of the secondary-side synchronous rectification transistor, the actual turn-on instant for the primary-side transistor switch is delayed to be not earlier than the turn-off instant K2 of the secondary-side synchronous rectification transistor.

The control circuit 101 independently determines the turn-off instant K2 of the secondary-side synchronous rectification transistor without detecting whether the primary-side transistor switch is ON or not, and then takes the turn-off instant K2 of the secondary-side synchronous rectification transistor as a basis for determining the actual turn-on instant for the primary-side transistor switch, achieving the purpose of avoiding shoot-through without delaying the primary-side transistor switch control signal. When there is no risk of shoot-through, e.g., in discontinuous inductor current mode (DCM) or steady-state continuous inductor current mode (CCM) operation of the isolated power supply, a control feedback loop in the control circuit 101 for the primary-side transistor switch Q1 may perform feedback control computation to choose to determine the actual turn-on instant for the primary-side transistor switch based on the supposed turn-on instant K1 without any additional delaying processing. As a result, the anti-shoot-through design does not affect feedback response or circuit performance at all. Moreover, when there is a risk of shoot-through, e.g., when a sudden load jump takes place in CCM operation of the isolated power supply, the primary-side transistor switch Q1 may be turned on following the turning off of the secondary-side synchronous rectification transistor only when such a risk of shoot-through has been confirmed. This eliminates the possibility of shoot-through, and since the control circuit only precisely intervenes and modifies the turn-on instant for the primary-side transistor switch rarely in some periods found to be with a high risk of shoot-through, only exerting a limited impact on the feedback response performance.

In the illustrated embodiment, the control circuit 101 is a secondary-side controller entirely incorporated in the secondary side of the isolated power supply 100.

In one embodiment, the primary-side transistor switch control signal PSC may be an electrical level signal, which turns on the primary-side transistor switch, for example, by its rising edge. The primary-side transistor switch control signal PSC may further contain information on a turn-off instant of the primary-side transistor switch and may turn off the primary-side transistor switch, for example, by its falling edge. In this way, the primary-side transistor switch control signal PSC contains all information for turning on or off the primary-side transistor switch Q1 and is able to turn on or off the primary-side transistor switch Q1.

In the illustrated embodiment, the control circuit 101 may further output a drive signal SRG for turning on or off the secondary-side synchronous rectification transistor SR. The drive signal SRG may be generated from the voltage signal V_Forw from the secondary-side winding. More details in control of the secondary-side synchronous rectification transistor SR and an associated circuit arrangement will be set forth below.

In the illustrated embodiment, the isolated power supply 100 further includes a primary-side controller 105 and a sensing circuit 106. The primary-side controller 105 is arranged on the primary side and configured to receive the primary-side transistor switch control signal PSC and generate, from information contained therein on the turn-on instant for the primary-side transistor switch, a primary-side transistor switch drive signal PSG. When the primary-side transistor switch control signal PSC further contains information on the turn-off time instant of the primary-side transistor switch, the primary-side controller 105 may directly generate the primary-side transistor switch drive signal PSG from the primary-side transistor switch control signal PSC. If the primary-side transistor switch control signal PSC contains only information on the turn-on instant for the primary-side transistor switch, the primary-side controller 105 may determine the turn-off instant of the primary-side transistor switch further based on any other suitable feedback signal, such as for example, a signal indicative of a detected current through the primary-side transistor switch, or a demagnetization signal present at a drain of the primary-side transistor switch. Those of ordinary skill in the art may design the circuit to determine the turn-off instant of the primary-side transistor switch using any suitable signal according to the actual requirements and feedback characteristics, and the present invention is not limited in this regard.

The sensing circuit 106 is configured to sense the secondary-side output voltage VOUT and generate the feedback signal VFB. In the illustrated embodiment, the sensing circuit 106 may be a separate component from the control circuit 101. In other embodiments, the sensing circuit 106 may be alternatively integrated with the control circuit 101 in a single die or chip. As well known to those skilled in the art, common examples of the sensing circuit 106 may include a resistive voltage divider, and a further detailed description thereof is omitted herein.

Figure 2:
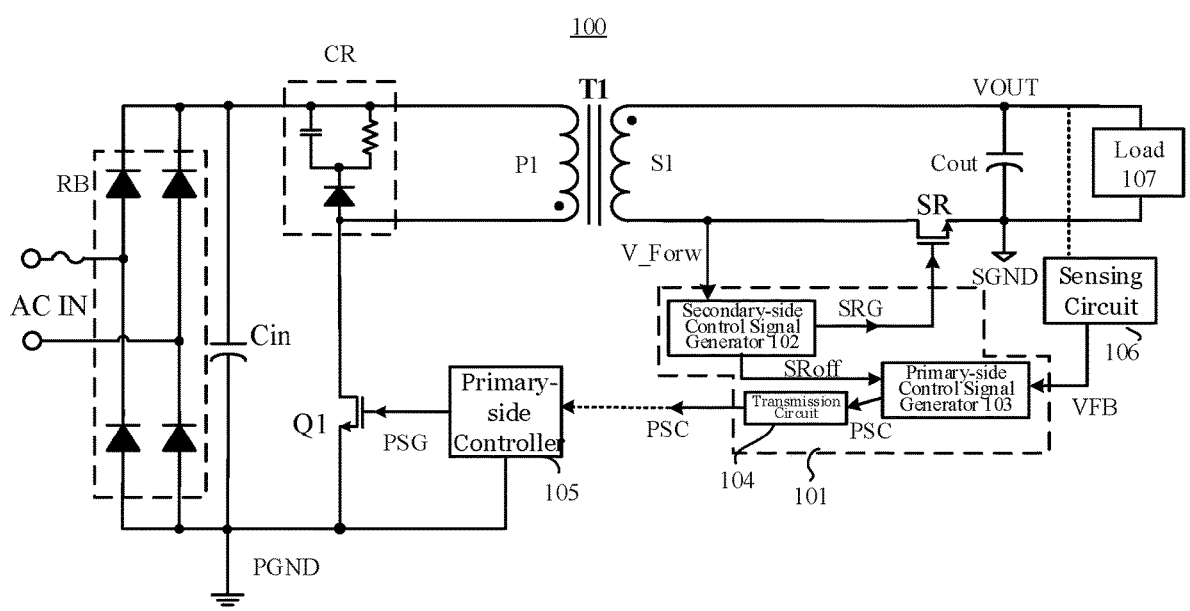
FIG. 2 shows a detailed block diagram of a control circuit 101 according to an embodiment of the present invention.

FIG. 2 shows a detailed block diagram of the control circuit 101 according to an embodiment of the present invention. As shown in FIG. 2, the control circuit 101 includes a secondary-side control signal generator 102 configured to receive the voltage signal V_Forw from the secondary-side winding in the isolated power supply and generate a secondary-side transistor switch control signal SRoff, which contains information on the turn-off instant K2 of the secondary-side synchronous rectification transistor SR for turning off the secondary-side synchronous rectification transistor SR. As would be appreciated by those of ordinary skill in the art, the secondary-side transistor switch control signal SRoff is not necessarily used to drive the secondary-side synchronous rectification transistor SR. In some embodiments, the secondary-side transistor switch control signal SRoff may be directly used as the drive signal SRG for the secondary-side synchronous rectification transistor SR to act on a gate of the secondary-side synchronous rectification transistor SR to turn it off. In alternative embodiments, SRoff may be an intermediate signal, and the drive signal SRG for driving the secondary-side synchronous rectification transistor may be generated from the intermediate signal. In still alternative embodiments, instead of being directly used as the drive signal for the secondary-side synchronous rectification transistor or as an indirect precursor thereof, SRoff and the final drive signal SRG for the secondary-side synchronous rectification transistor may be derived from a common source signal containing information on the turn-off instant K2 of the secondary-side synchronous rectification transistor SR or all the parameters required to derive the turn-off instant K2 of the secondary-side synchronous rectification transistor SR. When SRoff is generated earlier than SRG, the turn-off instant K2 of the synchronous rectification transistor indicated in SRoff is a theoretical value, which may be slightly earlier than an actual turn-off instant of the secondary-side synchronous rectification transistor. However, regardless of how the secondary-side switch control signal SRoff is related to the final drive signal SRG for the secondary-side synchronous rectification transistor, the purpose of the present invention can be achieved as long as SRoff contains information on the turn-off instant K2 of the secondary-side synchronous rectification transistor.

The secondary-side control signal generator 102 may employ any common conventional independent control approach to turn off the synchronous rectification transistor SR based on the received voltage signal V_Forw from the secondary-side winding in the isolated power supply without needing to detect whether the primary-side transistor switch Q1 is ON or not. As discussed in the Background section, in general cases, those of ordinary skill in the art may select a suitable conventional method and associated parameters to enable the secondary-side control signal generator 102 to substantially ensure the avoidance of cross conduction of the synchronous rectification transistor SR and the primary-side transistor switch Q1 when in steady-state operation even without an anti-shoot-through or anti-breakdown design. Moreover, in DCM operation of the isolated power supply 100, the secondary-side control signal generator 102 may turn off the synchronous rectification transistor SR following zeroing of the inductor current in order to avoid oscillation caused by ongoing conduction of the synchronous rectification transistor SR following zero-crossing. However, this design is still insufficient in effective avoidance of shoot-through and breakdown. More details of the secondary-side control signal generator 102 will be set forth in the following descriptions.

The control circuit 101 further includes a primary-side control signal generator 103 configured to receive the secondary-side transistor switch control signal SRoff and the feedback signal VFB of the isolated power supply's output voltage and generate therefrom the primary-side transistor switch control signal PSC that indicates the turn-on instant for the primary-side transistor switch. The primary-side control signal generator 103 determines a second turn-on instant K2 (i.e., the aforementioned turn-off instant K2 of the secondary-side synchronous rectification transistor) based on the secondary-side transistor switch control signal. Additionally, the primary-side control signal generator 103 determines a first turn-on instant K1 (i.e., the aforementioned supposed turn-on instant for the primary-side transistor switch) based on the feedback signal VFB of the isolated power supply's output voltage. The primary-side control signal generator 103 further determines the actual turn-on instant for the primary-side transistor switch based on the second turn-on instant K2 or the first turn-on instant K1, whichever is later, and thereby generates the primary-side transistor switch control signal PSC.

It is to be noted that, theoretically, the second turn-on instant K2 is just the turn-off instant of the secondary-side synchronous rectification transistor indicated in the signal SRoff as it was generated. However, in practical applications, during being transmitted from the secondary-side control signal generator 102 to the primary-side control signal generator 103 in order for the second turn-on instant to be compared with the first turn-on instant, SRoff may be delayed by an amount depending on the actual design and wiring requirements, creating a slight difference between the second turn-on instant to be compared and the turn-off instant of the secondary-side synchronous rectification transistor indicated in the signal SRoff as it was generated. As the delay amount is very slight and can be ignored, the second turn-on instant can be stilled considered as the turn-off instant of the secondary-side synchronous rectification transistor.

Further, as shown in FIG. 2, in one embodiment, the control circuit 101 is a secondary-side controller entirely incorporated in the secondary side and further includes a primary-side control signal transmission circuit 104 for receiving the primary-side transistor switch control signal PSC, modulating the signal PSC and transmitting it from the secondary side to the primary side. Specifically, the primary-side control signal transmission circuit 104 may employ any common technique for isolated communication between the primary and secondary sides, such as for example, optical coupling, magnetic coupling, capacitive coupling or on-off keying (OOK), and the modulated primary-side transistor switch control signal PSC may be transmitted in the form of a pulse signal.

Figure 3:
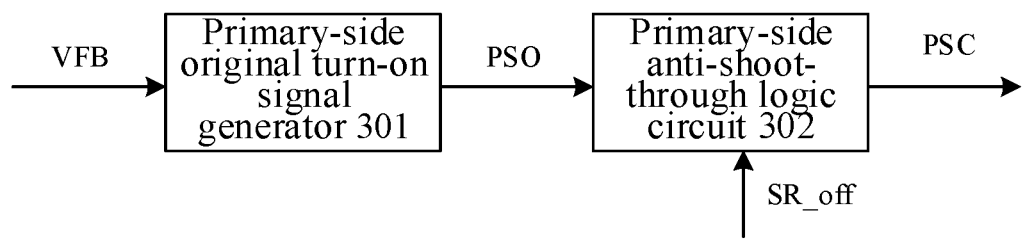
FIG. 3 shows a structural schematic block diagram of a primary-side control signal generator 103 according to an embodiment of the present invention.

FIG. 3 shows a structural schematic block diagram of the primary-side control signal generator 103 according to an embodiment of the present invention. As shown in FIG. 3, the primary-side control signal generator 103 may include a primary-side original turn-on signal generator 301 and an anti-shoot-through logic circuit 302. The primary-side original turn-on signal generator 301 may receive the feedback signal VFB of the output voltage of the isolated power supply 100 and generate a primary-side original turn-on instant signal PSO indicating the supposed turn-on instant for the primary-side transistor switch (i.e., the first turn-on instant K1). The anti-shoot-through logic circuit 302 may receive the primary-side original turn-on instant signal PSO and the secondary-side transistor switch control signal SRoff (indicating the second turn-on instant K2), and if the first turn-on instant K1 is later than the second turn-on instant K2, generate the primary-side transistor switch control signal PSC based on the secondary-side transistor switch control signal SRoff so that the turn-on instant for the primary-side transistor switch for the current period is not earlier than the second turn-on instant.

Figure 4:
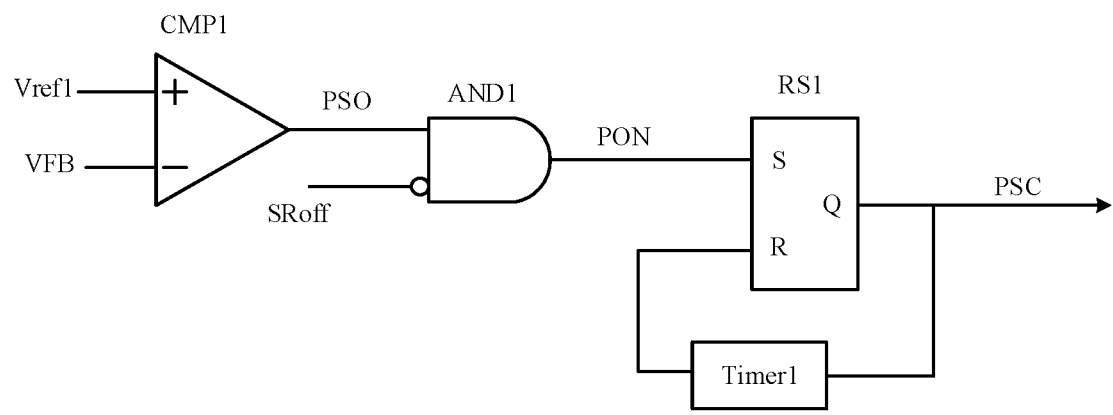
FIG. 4 shows a detailed structural schematic diagram of the primary-side control signal generator 103 according to an embodiment of the present invention.

FIG. 4 shows a detailed structural schematic diagram of the primary-side control signal generator 103 according to an embodiment of the present invention. The primary-side control signal generator may control the primary-side transistor switch by an on-time (COT) feedback control design. Specifically, the primary-side original turn-on signal generator 301 may include a first comparison block CMP1 configured to compare the feedback signal VFB of the isolated power supply's output voltage with a first reference Vref1, and upon the feedback signal VFB of the isolated power supply's output voltage dropping to the first reference Vref1, generate the primary-side original turn-on instant signal PSO indicating the supposed turn-on instant for the primary-side transistor switch.

In the embodiment shown in FIG. 4, the secondary-side transistor switch control signal may be an electrical level signal, and the anti-shoot-through logic circuit 302 may include a first logic gate receiving PSO and SRoff. When the primary-side original turn-on instant signal PSO indicates that it is suitable to turn on the primary-side transistor switch Q1 and if the secondary-side transistor switch control signal SRoff indicates that the turn-off instant K2 of the secondary-side synchronous rectification transistor SR has arrived, the first logic gate may output a primary-side transistor switch turn-on instant signal PON indicative of the arrival of the turn-on instant for the primary-side transistor switch. In the illustrated embodiment, the first logic gate may be a first AND gate AND1 having two inputs and one output. The primary-side original turn-on instant signal PSO may be received at the first input, and an inverted version of the secondary-side transistor switch control signal SRoff may be received at the second input. In response, the primary-side transistor switch turn-on instant signal PON may be output from the output of the first AND gate AND1. The primary-side transistor switch turn-on instant signal PON may also contain information on the turn-on instant for the primary-side transistor switch Q1. In some embodiments, the primary-side transistor switch turn-on instant signal PON may be directly taken as the primary-side transistor switch control signal PSC.

In some other embodiments such as that shown in FIG. 4, the primary-side transistor switch turn-on instant signal PON may be taken as a basis for generating the primary-side transistor switch control signal PSC. As shown in FIG. 4, the primary-side control signal generator may further include a first flip-flop RS1 having a set terminal S, a reset terminal R and an output terminal Q. The primary-side transistor switch turn-on instant signal PON may be received at the set terminal S, and the primary-side transistor switch control signal PSC may be responsively output from the output terminal Q.

The embodiment shown in FIG. 4 may further include a primary-side on-time timer Timer1 with an output connected to the reset terminal R of the first flip-flop RS1. The timer Timer1 may start to count down a predetermined period of time Tonp based on the information on the turn-on instant for the primary-side transistor switch and output a reset signal to the reset terminal R of the first flip-flop RS1 upon the expiry of the period. Tonp may be an on-time length of the primary-side transistor switch. The primary-side on-time timer Timer1 may be triggered by any signal containing information on the turn-on instant for the primary-side transistor switch. For example, in the embodiment shown in FIG. 4, the primary-side on-time timer Timer1 may obtain information on the turn-on instant for the primary-side transistor switch from the primary-side transistor switch control signal PSC received at its input. Alternatively, the primary-side on-time timer Timer1 may directly receive the primary-side transistor switch turn-on instant signal PON and obtain information on the turn-on instant for the primary-side transistor switch therefrom.

Figure 5A:
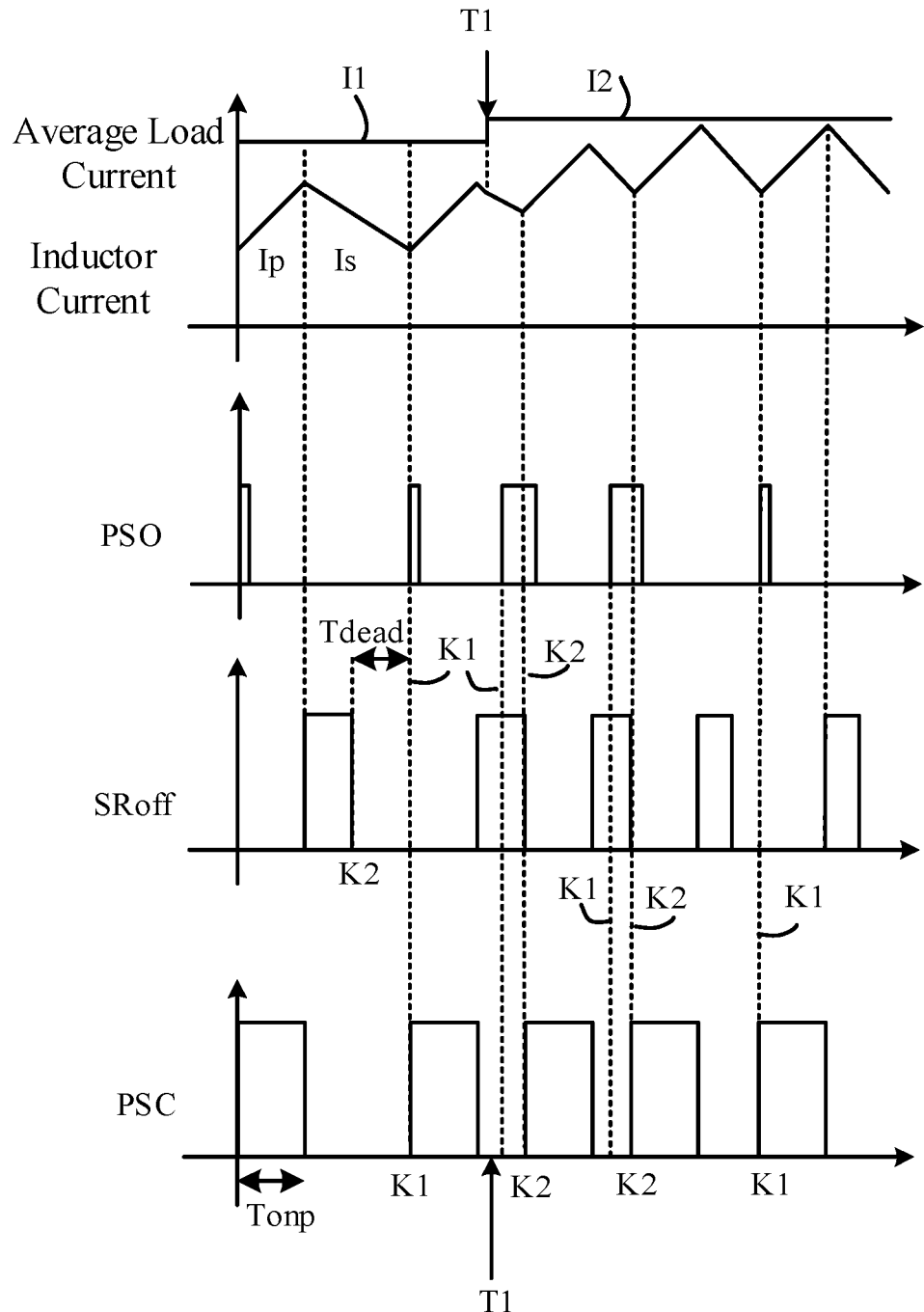
FIGS. 5A and 5B show operating waveforms of the primary-side control signal generator 103 according to the embodiment of FIG. 4.
Figure 5B:
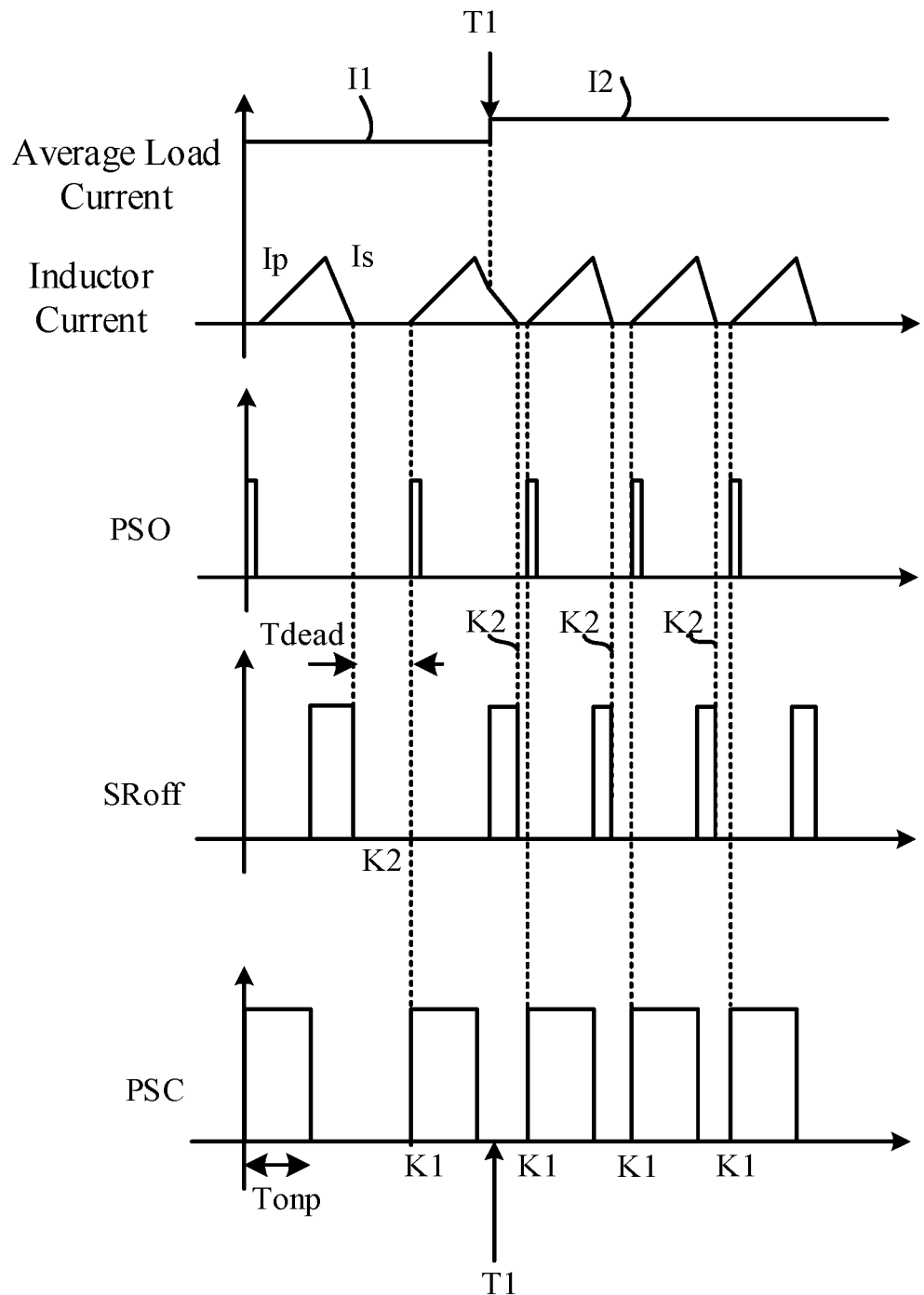

FIGS. 5A and 5B show operating waveforms of the primary-side control signal generator 103 according to the embodiment shown in FIG. 4. The working principles of the primary-side control signal generator 103 will be described below with reference to FIGS. 4, 5A and 5B as an example. FIG. 5A shows operating waveforms in CCM operation of the isolated power supply 100. For ease of illustration, a primary-side current Ip and a secondary-side current Is are shown as a single waveform collectively labeled and referred to hereafter as "inductor current". Those skilled in the art will appreciate that, as for the illustrated embodiment, the term "inductor current" does not refer to a real-world current but the combined waveform of the primary-side current Ip and the secondary-side current Is. Moreover, for ease of explanation of the waveforms here and hereafter, it is presumed that an on-time length of the secondary-side synchronous rectification transistor can vary in response to loading changes. Prior to the time instant T1, the isolated power supply 100 operates in an ideal steady state at an average load current of I1, where an appropriate dead time Tdead for avoiding cross conduction of the primary-side transistor switch Q1 and the synchronous rectification transistor SR can be established simply by the COT feedback loop design of the primary-side transistor switch. Under this condition, when the feedback signal VFB is lower than the first reference Vref1 and thus causes PSO to be high, the synchronous rectification transistor is turned off, causing SRoff to be low. Therefore, the first AND gate AND1 receiving its inverted version outputs a high level, setting the first flip-flop RS1. As a result, PSC output from the first flip-flop RS1 is high and turns on the primary-side transistor switch. At the same time, the primary-side on-time timer Timer1 start to count down, and VFB rises with the inductor current. After Timer1 completes the countdown of Tonp, the first flip-flop RS1 is reset, and PSC is low and turns off the switch. The synchronous rectification transistor SR is then turned on to start freewheeling, and VFB decreases with inductor current. Throughout this period, SRoff does not affect the turn-on instant for the primary-side transistor switch at all, and K1 is just the theoretical turn-on instant for the primary-side transistor switch. The final actual turn-on instant for the primary-side transistor switch depends only on an inherent delay caused by the transmission of PSC for forming PSG that turns on the primary-side transistor switch without introducing any additional delay, and excellent feedback performance is obtained. At T1, the average load current jumps from I1 to I2 that is higher, and the isolated power supply 100 starts to operate in a transient response state. Due to the rise in load current, VFB sharply drops to VREF1, causing PSO to transition high. However, at this point, as the secondary-side synchronous rectification transistor SR is still under the effect of independent control and not turned off yet, SRoff remains high and its inverted version is low, causing the first AND gate AND1 to output a low level. This continues until the turn-off instant of the synchronous rectification transistor arrives. Then, SRoff drops low, and the first AND gate AND1 outputs a high level that pulls PSC high, turning the primary-side transistor switch on and eliminating the possibility of shoot-through or breakdown. After the transient response dies out at T2 and steady-state operation is re-established, the primary-side control signal generator returns to the same state as prior to T1, and SRoff no longer has any effective impact on PSC.

FIG. 5B shows operating waveforms in DCM operation of the isolated power supply 100. In this mode, the synchronous rectification transistor SR is turned off following zeroing of the inductor current in order to avoid the occurrence of oscillation. As a result, SRoff will become low at the same time. Therefore, whether the isolated power supply 100 is in a steady state or has entered a transient response state following an abrupt change in the load current, the presence of a zero-current interval makes it sure that SRoff drop low earlier than a drop of VFB to VREF1. Thus, SRoff has no impact on the generation of PSC at all in DCM operation, and K1 is also simply the theoretical turn-on instant for the primary-side transistor switch. Therefore, in DCM operation, the final actual turn-on instant for the primary-side transistor switch also depends only on an inherent delay caused by the transmission of PSC for forming PSG that turns on the primary-side transistor switch without introducing any additional delay, and excellent feedback performance is also obtained.

Figure 6:
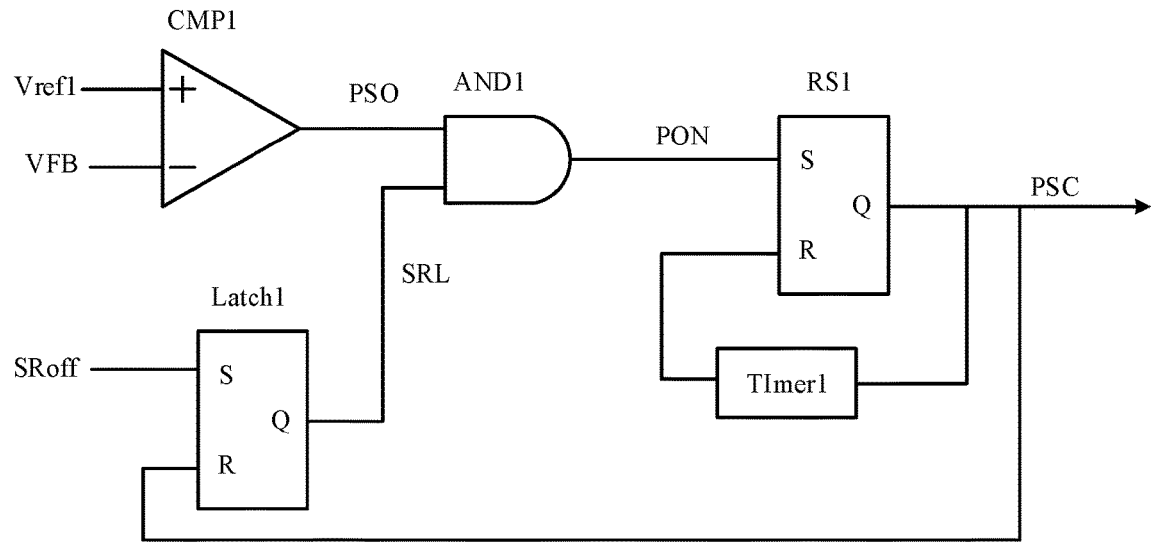
FIG. 6 shows a detailed structural schematic diagram of a primary-side control signal generator 103 according to another embodiment of the present invention.

FIG. 6 shows a detailed structural schematic diagram of the primary-side control signal generator 103 according to another embodiment of the present invention. The embodiment shown in FIG. 6 differs from that of FIG. 4 in that the secondary-side transistor switch control signal SRoff is a pulse signal. Accordingly, the anti-shoot-through logic circuit 402 further includes a first latch Latch1 for latching the received secondary-side transistor switch control signal SRoff and outputting the latched signal SRL. In the illustrated embodiment, the latch Latch1 is implemented as an RS flip-flop. Accordingly, the primary-side original turn-on instant signal PSO and the latched signal SRL are respectively received at the two inputs of the first AND gate AND1 that serves as the first logic gate, and the primary-side transistor switch turn-on instant signal PON is output from the first AND gate AND1.

Further, the primary-side transistor switch control signal PSC output from the first flip-flop RS1 is also provided to the first latch Latch1 in order to reset the first latch Latch1 based on information on the turn-on instant for the primary-side transistor switch. Likewise, the first latch Latch1 is not limited to being resettable only by the primary-side transistor switch control signal PSC. Instead, it can be reset by any signal contain information on the turn-on instant for the primary-side transistor switch.

Figure 7:
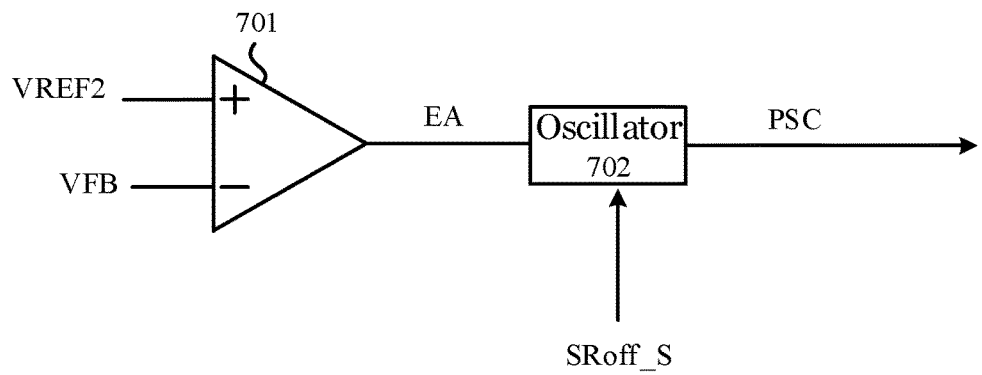
FIG. 7 shows a structural schematic diagram of a primary-side control signal generator 103 according to yet another embodiment of the present invention.

Although COT feedback control is employed in the embodiments shown in FIGS. 4 and 6, as would be appreciated by those of ordinary skill in the art, the primary-side control signal generator 103 is not limited to using COT control, and any conventional feedback control technique that can be based on the output voltage feedback signal VFB and is suitable to control the primary-side transistor switch. For example, FIG. 7 shows a structural schematic diagram of the primary-side control signal generator 103 according to yet another embodiment of the present invention. As shown in FIG. 7, in the primary-side control signal generator 103, the secondary-side transistor switch control signal SRoff may be asserted to enable the primary-side control signal generator 103 or not, and the second turn-on instant K2 may be a time instant when the secondary-side transistor switch control signal SRoff is asserted to enable the primary-side control signal generator 103.

Specifically, the primary-side control signal generator 103 shown in FIG. 7 may include a first error amplifier 701 and an oscillator 702. The first error amplifier 701 may be configured to amplify a difference between the feedback signal VFB of the isolated power supply's output voltage and a second reference VREF2 and output an amplified error signal EA. The oscillator 702 may receive the amplified error signal EA and the secondary-side transistor switch control signal SRoff and generate a square wave signal as the primary-side transistor switch control signal PSC. A frequency of the square wave signal may be determined by the amplified error signal EA, and a rising or falling edge of the square wave signal may indicate the turn-on instant for the primary-side transistor switch. When the oscillator 702 determines that the edge of the square wave signal is supposed to arrive based on the current frequency determined by EA, but the secondary-side transistor switch control signal SRoff has not been asserted yet, the oscillator 702 may delay the rising or falling edge of the square wave signal to a time instant not earlier than the instant K2 when the secondary-side transistor switch control signal SRoff is asserted.

Figure 8:
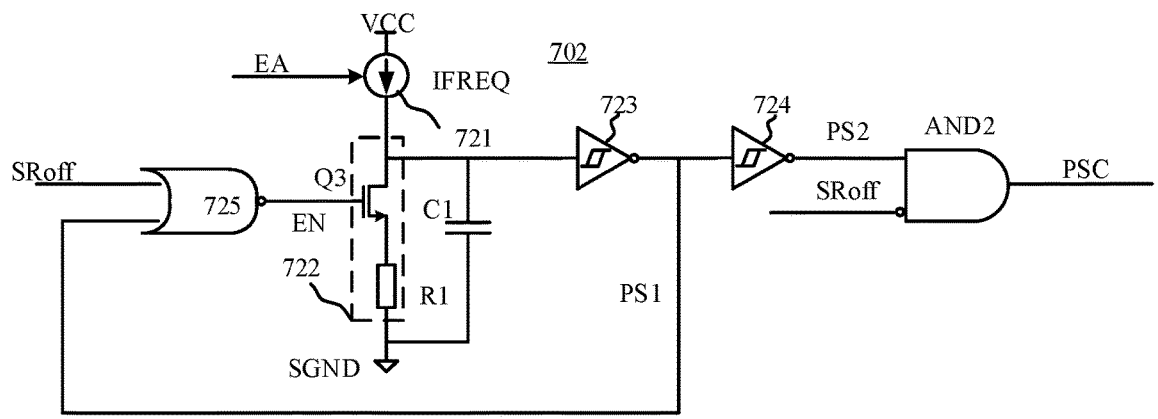
FIG. 8 shows a schematic circuit diagram of an oscillator 702 according to an embodiment.

In some embodiments, the time instant determined as the instant of supposed arrival of the edge of the square wave signal by the oscillator 702 based on the current frequency may be the first turn-on instant K1, and the oscillator 702 may check whether the enable signal EN (i.e., SRoff) is asserted at the first turn-on instant K1. FIG. 8 shows a structural schematic diagram of the oscillator 702 according to one of such embodiments. The oscillator 702 may include: a frequency setting current source 721 for generating a frequency setting current IFREQ based on the amplified error signal EA; a frequency setting capacitor C1 having a first terminal for receiving the frequency setting current IFREQ and a second terminal for receiving the reference ground SGND; a discharge branch 722 including, in the illustrated embodiment, a discharge control switch Q3 and a discharge resistor R1, which are connected in series to both terminal of the frequency setting capacitor C1, the discharge control switch Q3 being controlled by an enable signal EN; a first hysteresis inverter 723 with an input connected to the first terminal of the frequency setting capacitor C1; a second hysteresis inverter 724 with an input connected to an output of the first hysteresis inverter 723; an enable NOR gate 725 having a first input receiving the secondary-side transistor switch control signal SRoff, a second input connected to an output of the first hysteresis inverter 723 and an output for outputting the enable signal EN; and a second AND gate AND2 having a first input connected to an output of the second hysteresis inverter 724, a second input receiving the inverted version of the secondary-side transistor switch control signal SRoff and an output outputting the primary-side transistor switch control signal PSC.

The discharge branch 722 is not limited to being implemented as the series discharge control switch Q3 and discharge resistor R1 as in the illustrated embodiment. For example, in other embodiments, the discharge resistor R1 may be replaced with a discharge current source. The discharge branch 722 may start or stop discharging under the control of the enable signal EN and may form, together with the frequency setting capacitor C1, a discharge loop with a capacitive time constant. In some embodiments, the capacitive time constant may be adjusted as needed by changing the resistance of R1 or a current from the discharge current source to allow the discharge branch 722 to achieve a desired discharge time, thereby resulting in a change in the on-time duration of the primary-side transistor switch to which the primary-side transistor switch control signal PSC corresponds.

Figure 9:
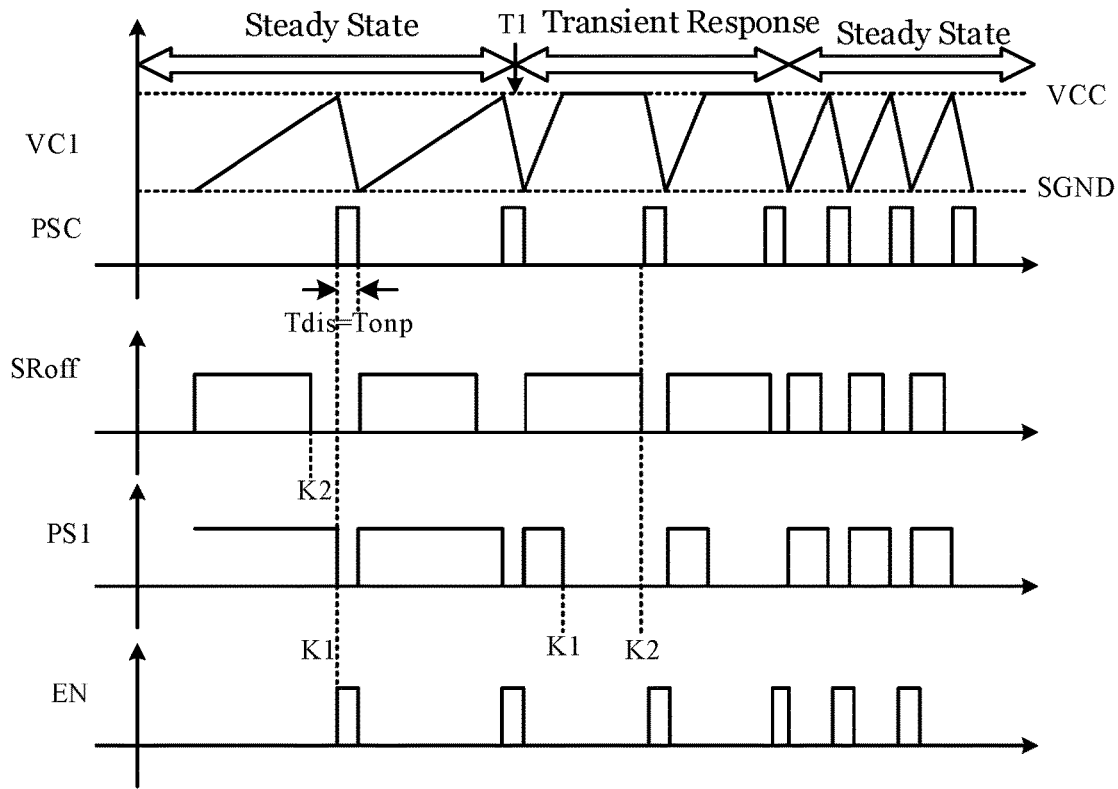
FIG. 9 shows operating waveforms of the oscillator 702 according to the embodiment shown in FIG. 8.

FIG. 9 shows operating waveforms of the oscillator according to the embodiment shown in FIG. 8. Below, reference will be made to both FIGS. 8 and 9 to describe the working principles of the oscillator 702. For ease of description, here, it is assumed that upper and lower thresholds for the first hysteresis inverter are VCC and SGND potentials, respectively. It is also assumed that the secondary-side transistor switch control signal SRoff contains information on both the turn-on and turn-off time instants for the secondary-side synchronous rectification transistor and the on-time length of the secondary-side synchronous rectification transistor is variable. In steady-state operation prior to T1, from the turn-on instant for the primary-side transistor switch in the previous period, the frequency setting current source charges C1 at IFREQ set based on the output signal EA. As a result, a voltage VC1 across both ends of C1 gradually increases and when it reaches the upper threshold VCC for the first hysteresis inverter 723, the first hysteresis inverter 723 outputs a low level electrical signal PS1 and the second hysteresis inverter 724 outputs a high level electrical signal PS2. PS1 and PS2 indicate the supposed turn-on instant K1 (i.e., the first turn-on instant) for the primary-side transistor switch. Because of the steady-state operation, SRoff drops low at K1, raising the enable signal EN high and closing the discharge branch 722 at K1, which then starts discharging C1. Under the action of the resistor R1 in the discharge branch 722, the voltage across both terminal of C1 reaches the lower threshold SGND for the first hysteresis inverter 723 after a discharge period of time Tdis. At this point, the second hysteresis inverter 724 outputs a low level electrical signal, which pulls PSC low via the second AND gate AND2. At the same time, the first hysteresis inverter 723 outputs a high level electrical signal to the enable NOR gate 725, pulling EN low and initiating another charge cycle of C1 at IFREQ. Thus, the discharge period of time Tdis is the on-time length Tonp of the primary-side transistor switch. In response to an abrupt change in the load current at T1, EA causes an increase in IFREQ, allowing the voltage across both ends of C1 to reach the upper threshold VCC of the first hysteresis inverter 723 in a shorter time when compared to the case of steady-state operation. The first hysteresis inverter 723 then transitions to a low level, indicating the arrival of the supposed turn-on instant K1 for the primary-side transistor switch. However, at the same time, as SRoff has not yet indicated the turn-off of the secondary-side synchronous rectification transistor, neither does the signal EN change under the action of the enable NOR gate 725 nor does the signal PSC change under the action of the second AND gate AND2. Finally, when SRoff starts indicating the turn-off instant K2 (i.e., the second turn-on instant) of the secondary-side synchronous rectification transistor, the signal PSC transitions high to indicate the arrival of the turn-on instant for the primary-side transistor switch. In this way, cross conduction of the primary-side transistor switch and the secondary-side synchronous rectification transistor is effectively avoided.

Figure 10:
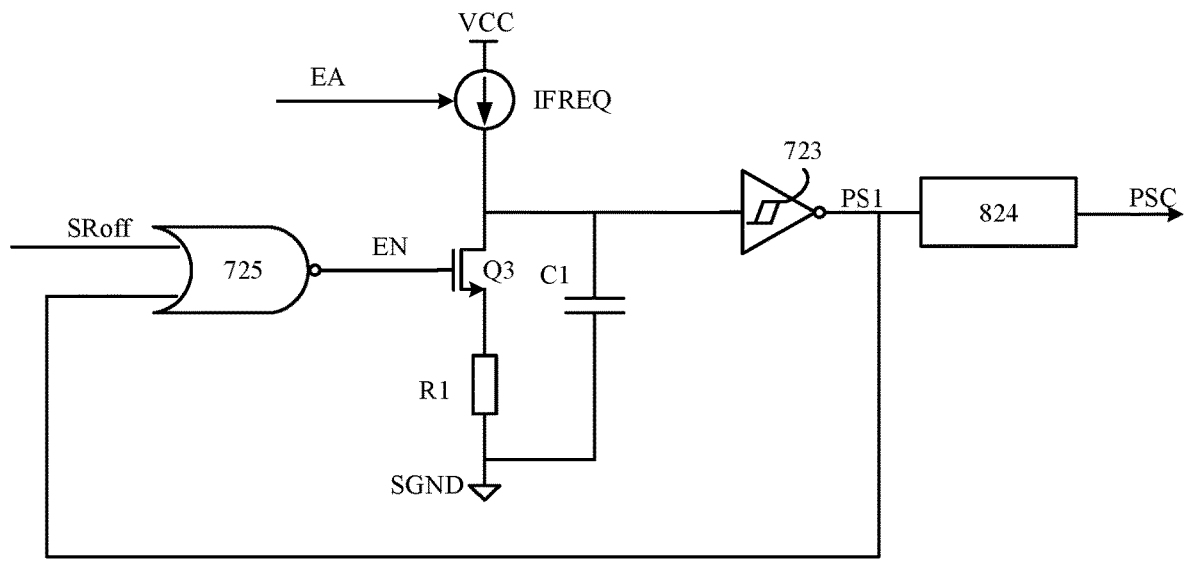
FIG. 10 shows a schematic circuit diagram of an oscillator 702 according to another embodiment.

In some other embodiments, the oscillator 702 may determine a supposed time instant of arrival of the edge of the square wave signal based on the current frequency as the first turn-on instant K1, and check prior to the first turn-on instant K1 whether the enable signal EN (i.e., SRoff) is asserted. This can additionally avoid cross conduction of the primary-side transistor switch and the secondary-side synchronous rectification transistor under extreme conditions. FIG. 10 shows a schematic circuit diagram of the oscillator 702 according to one of such embodiments. In the embodiment shown in FIG. 10, an edge detection circuit 824 is included in place of the second hysteresis inverter 724 and the second AND gate AND2 in the embodiment of FIG. 8. As shown in FIG. 10, the edge detection circuit 824 is connected at an input thereof to the output of the first hysteresis inverter 723 and configured to detect a rising edge, and an output of the edge detection circuit 824 provides the primary-side transistor switch control signal PSC.

Although the edge detection circuit 824 has been described and illustrated in FIG. 10 as being configured to detect a rising edge of the output signal PS1 of the first hysteresis inverter 723, in other embodiments, the edge detection circuit 824 may be alternatively configured to determine the primary-side transistor switch control signal PSC based on a detection of a falling edge of PS1. The latter case actually checks whether the enable signal EN is asserted at the same time as the arrival of the first turn-on instant K1. Further, in order to address various actual applications with different reliability requirements, appropriate selections may be made from the signal detection modes and the rising and falling edges.

Figure 11:
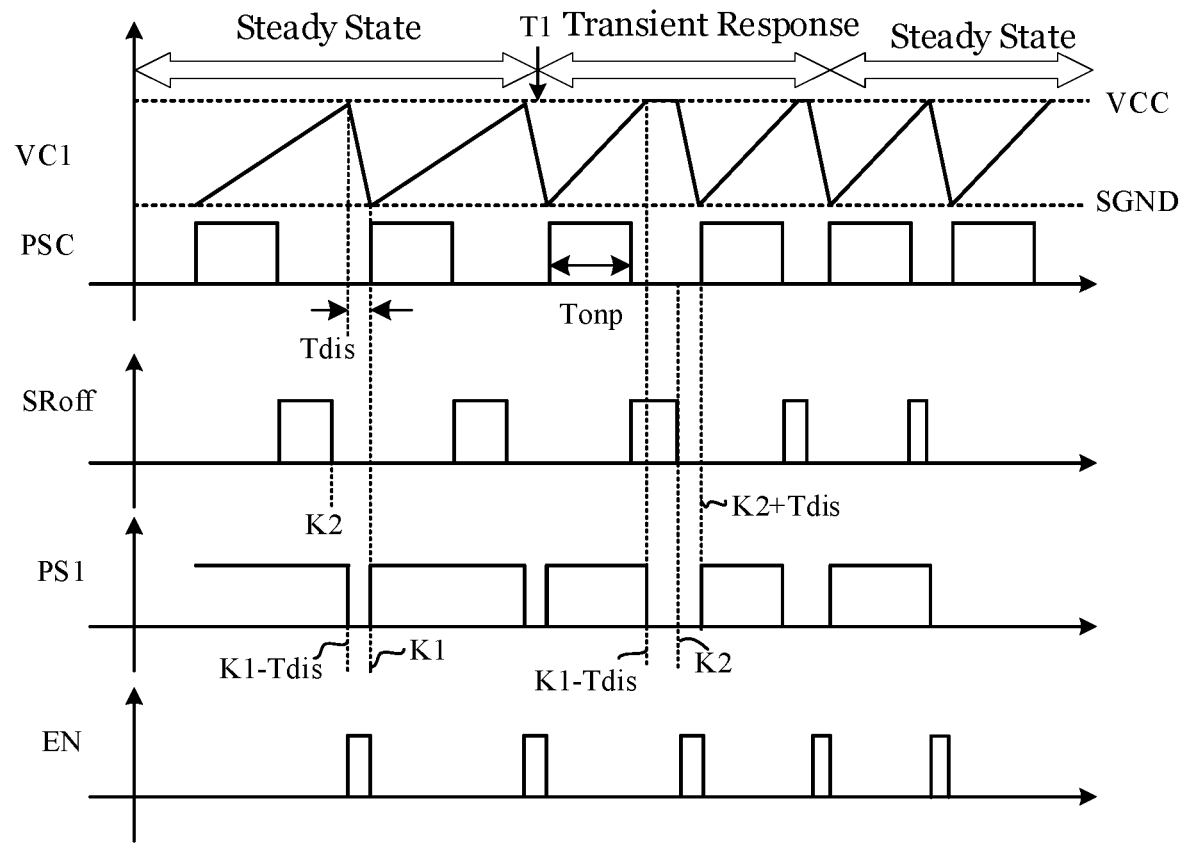
FIG. 11 shows operating waveforms of the oscillator 702 according to the embodiment shown in FIG. 10.

FIG. 11 shows operating waveforms according to the embodiment of FIG. 10. As shown in FIG. 11, when the capacitor C1 is discharged to an extent that the voltage across its both terminal drops to the lower threshold SGND, the first hysteresis inverter 723 transitions from low to high, creating a rising edge on PS1, and the edge detection circuit 824 responsively outputs a single trigger pulse as the primary-side transistor switch control signal PSC, indicating the arrival of the turn-on instant for the primary-side transistor switch. When C1 is charged at IFREQ until the upper threshold VCC of the first hysteresis inverter 723 is reached, the output of the first hysteresis inverter 723 transitions from high to low, creating a falling edge, which is provided to the enable NOR gate 725 and compared thereby with SRoff. In steady-state operation, SRoff will indicate that the turn-off instant K2 of the secondary-side synchronous rectification transistor is earlier than the falling edge of PS1 (i.e., K1−Tdis) output from the first hysteresis inverter 723. As a result, Q3 is conducted, initiating a discharge of C1. After the elapse of the discharge period of time Tdis, the voltage across both ends of C1 reaches the lower threshold SGND, and a rising edge accordingly appears on PS1 from the first hysteresis inverter 723, indicating the arrival of the instant K1. When the edge is detected by the edge detection circuit 824, the signal PSC indicates the arrival of the turn-on instant for the primary-side transistor switch. By contrast, when in a transient response state, as discussed above in connection with FIG. 8, the falling edge of the output signal of the first hysteresis inverter 723 will arrive at an earlier time. In this case, the falling edge K1−Tdis is earlier than the turn-off instant of the secondary-side synchronous rectification transistor indicated in SRoff. Consequently, the output signal EN of the enable NOR gate remains low, with Q3 being still OFF and C1 being maintained at the potential VCC. As a result, the rising edge of PS1 will not appear at the supposed turn-on instant K1, i.e., the instant of the appearance of the falling edge on PS1 plus (+) Tdis, leading to absence of a meaningful signal transition at K1. Thus, edge detection circuit 824 does not output a pulse to turn on the primary-side transistor switch. The enable signal EN enables the discharge branch 722 until SRoff indicates the arrival of the turn-off instant of the secondary-side synchronous rectification transistor, and the rising edge of the output signal of the first hysteresis inverter 723 arrives after the discharge period of time Tdis (i.e., K2+Tdis). Responsively, the edge detection circuit 824 outputs a pulse signal as PSC, indicating the turn-on instant (i.e., K2+Tdis) for the primary-side transistor switch.

In the embodiment shown in FIG. 10, the supposed turn-on instant K1 (i.e., first turn-on instant) for the primary-side transistor switch is the instant of arrival of the falling edge of the output signal PS1 of the first hysteresis inverter 723 plus the discharge period of time Tdis. Here, Tdis provides a buffer for decision-making. When the instant of arrival of the falling edge K1−Tdis of the output signal PS1 of the first hysteresis inverter 723 is earlier than the turn-off instant K2 of the secondary-side synchronous rectification transistor indicated in SRoff, it is considered that the supposed turn-on instant K1 for the primary-side transistor switch will be later than K2 and thus there is a possibility of shoot-through of the primary-side transistor switch Q1 and the secondary-side synchronous rectification transistor SR. Arranging Tdis allows additionally increased reliability of determination. Differing from the embodiment shown in FIG. 8 in which Tdis is taken as the on-time length Tonp of the primary-side transistor switch, in the embodiment of FIG. 10, the on-time length Tonp of the primary-side transistor switch is in no relation to Tdis, but may be instead determined by a width of the output pulse of the edge detection circuit 824, as shown in the figure. Alternatively, without departing from the scope of the present invention as defined by the appended claims, the output pulse of the edge detection circuit 824 may only determine the turn-on instant for Q1, and Tonp may be generated by another suitable mechanism such as, for example, timing or Q1 current peak detection.

A description of the secondary-side control signal generator 102 will be set forth below. In one embodiment, the secondary-side control signal generator 102 may also employ COT control. The secondary-side control signal generator 102 receives the voltage signal V_Forw from the secondary-side winding. If the voltage signal V_Forw from the secondary-side winding is equal to a third reference VREF3, the secondary-side control signal generator 102 turns on the secondary-side synchronous rectification transistor and starts counting down a first predetermined period of time Tson. After the elapse of the period, the secondary-side control signal generator 102 generates the secondary-side transistor switch control signal SRoff indicating the turn-off instant K2 of the secondary-side synchronous rectification transistor. The first predetermined period of time Tson may be either fixed or variable. In some embodiments, the secondary-side control signal generator 102 may further determine, from the voltage signal V_Forw from the secondary-side winding, whether the secondary-side inductor current is in a zero-current interval following a zero-crossing. If it is in a zero-current interval, no matter the countdown of the first predetermined period of time Tson is complete or not, the secondary-side transistor switch control signal SRoff indicating the turn-off instant K2 of the secondary-side synchronous rectification transistor will be generated. In this way, SRoff can take account into both CCM operation and DCM operation through using a COT turn-off mode in CCM operation and using a timely turn-off mode following a zero-crossing of the inductor current in DCM operation.

As described above, the secondary-side transistor switch control signal SRoff can further contain turn-on information of the secondary-side synchronous rectification transistor and thus serve as a secondary-side transistor switch drive signal for directly driving the secondary-side synchronous rectification transistor, or as a basis for generating such a secondary-side synchronous rectification transistor drive signal.

In the COT control mode, according to one embodiment, the turn-on information of the secondary-side synchronous rectification transistor contained in the secondary-side transistor switch control signal SRoff may be further used to indicate the turn-on of the secondary-side synchronous rectification transistor and thus start a timer.

Figure 12:
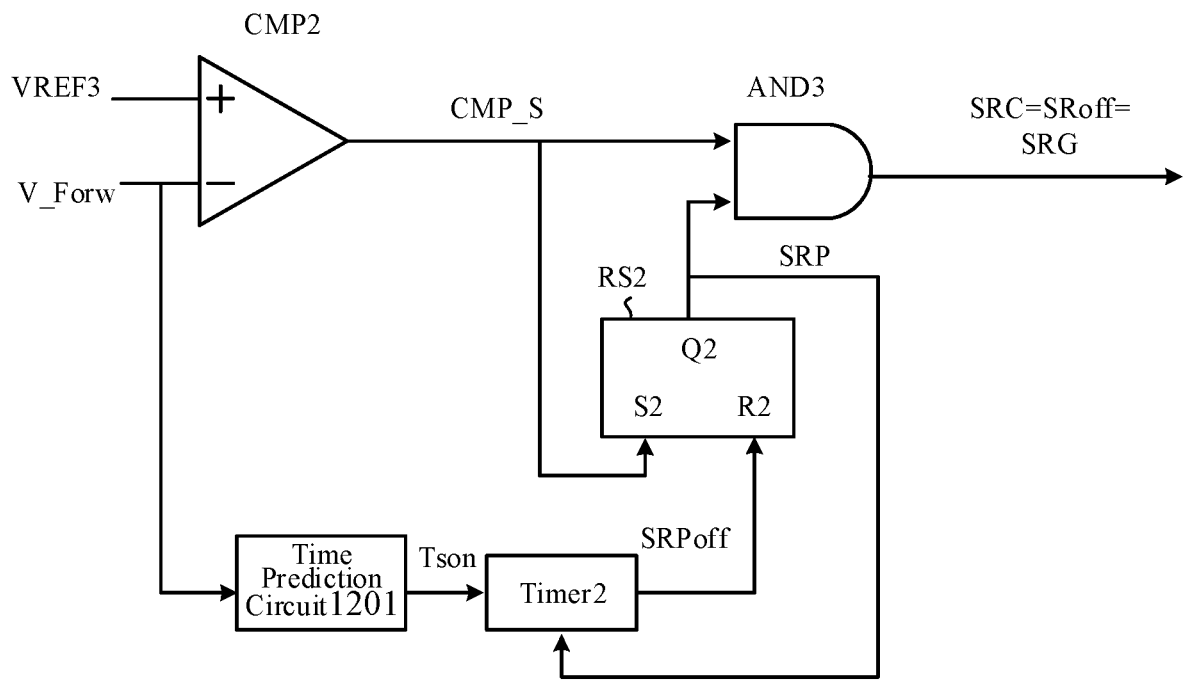
FIG. 12 shows a structural schematic diagram of a secondary-side control signal generator 102 according to an embodiment of the present invention.

FIG. 12 shows a structural schematic diagram of the secondary-side control signal generator 102 according to an embodiment of the present invention. As shown in FIG. 12, the secondary-side control signal generator 102 may include a second comparator CMP2, a second flip-flop RS2 and a secondary-side control timer Timer2. The second comparator CMP2 may have a first input receiving the voltage signal V_Forw from the secondary-side winding, a second input receiving the third reference VREF3, and an output providing a signal CMP_S. The second flip-flop RS2 may have a set terminal S2, a reset terminal R2 and an output terminal Q2. The set terminal S2 of the second flip-flop RS2 may be connected to the output of the second comparator CMP2. The secondary-side control timer Timer2 may have a timer starter terminal and a timing result output terminal. The timer starter terminal may start a timer upon the secondary-side synchronous rectification transistor being turned on, and a timing result may be output to the reset terminal R2 of the second flip-flop upon the elapse of the first predetermined period of time Tson.

In the illustrated embodiment, a signal SRP output from the output terminal Q2 of the second flip-flop RS2 may be received at the timer starter terminal of the secondary-side control timer Timer2 as an indication that the secondary-side synchronous rectification transistor has been turned on and it is suitable to start a timer.

In another embodiment, the output signal CMP_S of the second comparator CMP2 may be used to indicate the turning on of the secondary-side synchronous rectification transistor and to initiate a timer. In this case, the output signal CMP_S of the second comparator CMP2 may be directly coupled to the timer starter terminal of the secondary-side control timer Timer2.

As discussed above, any signal containing turn-off information of the secondary-side synchronous rectification transistor may be used as the secondary-side transistor switch control signal SRoff. For example, in one embodiment, the output signal SRP of the second flip-flop RS2 may serve as the secondary-side transistor switch control signal SRoff.

In another embodiment, a signal SRPoff output from the timing result output terminal of the secondary-side control timer Timer2 may be used as the secondary-side transistor switch control signal SRoff. In this case, the signal output from the timing result output terminal may be a single pulse signal.

In the illustrated embodiment, the secondary-side control signal generator 102 may further include a third AND gate AND3 with two inputs and one output. The two inputs may be connected respectively to the output of the second comparator CMP2 and the output terminal Q2 of the second flip-flop RS2. In the illustrated embodiment, an output signal SRC of the third AND gate AND3 may be taken as the secondary-side transistor switch control signal SRoff. In CCM operation of the isolated power supply, once the synchronous rectification transistor is turned on, V_Forw is approximately equal to the secondary-side ground potential and is always lower than VREF3. Moreover, the second comparator CMP2 may output a high level to the input of the third AND gate AND3 so that the output of the third AND gate AND3 depends solely on the output terminal Q2 of the second flip-flop RS2. That is, the timing result determines the output of the third AND gate AND3. In DCM operation of the isolated power supply, if a zero-crossing of the inductor current takes place before the secondary-side control timer Timer2 has counted the first predetermined period of time Tson down to zero, oscillation may occur on the secondary side and raise V_Forw to VREF3. When this happens, the low level at the output of the second comparator CMP2 will immediately pull down the output of the third AND gate AND3, turning off the secondary-side synchronous rectification transistor.

Further, the secondary-side control signal generator 102 may generate the aforementioned secondary-side synchronous rectification transistor drive signal SRG. In the illustrated embodiment, SRC=SRG. In other embodiments, SRG may also be generated indirectly from SRC.

In the illustrated embodiment, the secondary-side control signal generator 102 may further include a synchronous rectification time prediction circuit 1201, which allows a more accurate turn-off instant of the secondary-side synchronous rectification transistor in steady-state operation, an optimized dead time and improved efficiency, as well as enhanced transient response performance achieved through enabling the primary-side transistor switch to be turned on at a supposed turn-on instant under most loading conditions. The synchronous rectification time prediction circuit 1201 may be configured to predict a turn-off instant of the synchronous rectification transistor and generate the first predetermined period of time Tson in a flexible way. The synchronous rectification time prediction circuit 1201 may output information on the first predetermined period of time Tson that represents an on-time length of the secondary-side synchronous rectification transistor to the secondary-side control timer Timer2. Those skilled in the art will appreciate that any technique capable of predicting a turn-off instant of the synchronous rectification transistor (optionally through predicting the on-time length of the secondary-side synchronous rectification transistor) may be used for this purpose. At present, there are available a number of methods able to predict a turn-off instant of the secondary-side synchronous rectification transistor. For example, in the illustrated embodiment, the synchronous rectification time prediction circuit 1201 may generate, from the voltage signal V_Forw from the secondary-side winding received at an input thereof, the first predetermined period of time Tson, and determine a turn-off instant of the synchronous rectification transistor SR as the time after the elapse of Tson following the turn-on of the synchronous rectification transistor SR. As another example, in other embodiments, Tson may be generated based on the current switching frequency derived from the signal CMP_S received by the time prediction circuit. A description of specific algorithm used is omitted here for the sake of brevity.

Figure 13:
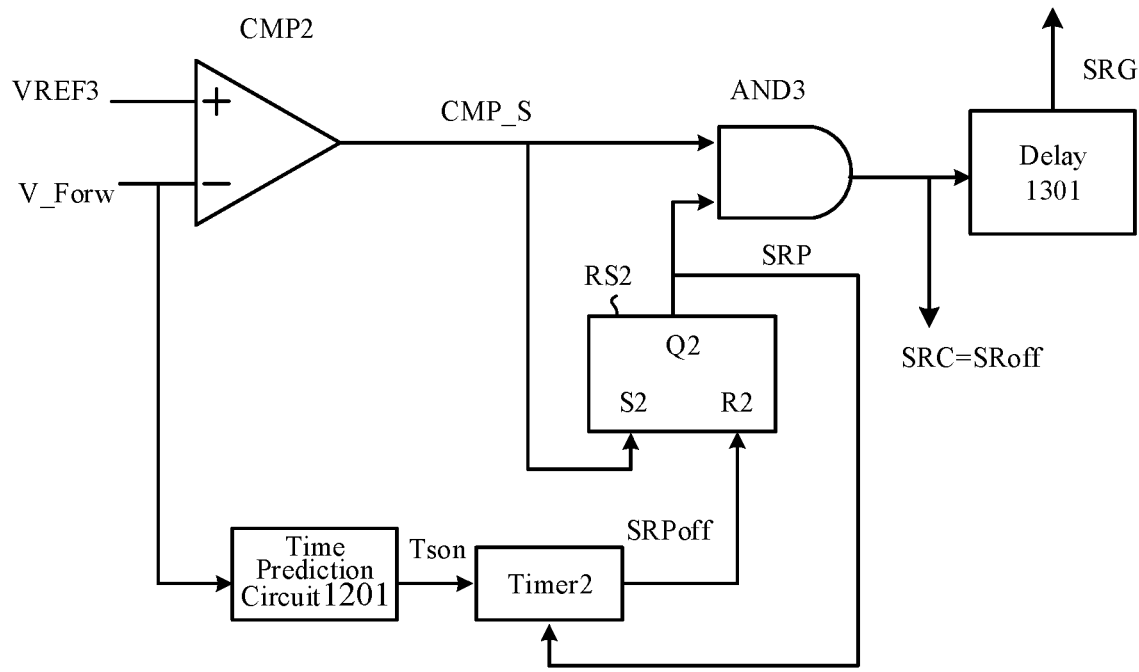
FIG. 13 shows a detailed structural schematic diagram of an isolated power supply control circuit 101 according to another embodiment of the present invention.

FIG. 13 shows a detailed structural schematic diagram of the isolated power supply control circuit 101 according to another embodiment of the present invention. Compared to the embodiment shown in FIG. 2, the isolated power supply control circuit 101 further includes a first delay circuit 1301 configured to delay the turn-off instant of the secondary-side synchronous rectification transistor in order to reduce a dead time from the secondary-side transistor switch being turned off to the primary-side transistor switch being turned on but not to delay the turn-off instant of the secondary-side transistor switch indicated by the secondary-side transistor switch control signal SRoff. In the illustrated embodiment, the first delay circuit 1301 may receive the output signal SRC of the third AND gate AND3, delay it and provides the delayed signal as the secondary-side synchronous rectification transistor drive signal SRG. When SRC is used as the secondary-side transistor switch control signal SRoff, the turn-off instant of the secondary-side transistor switch indicated by SRoff may be earlier than the actual turn-off instant of the secondary-side transistor switch. This delay design can partially offset the delay incurred during the transmission of the generated primary-side transistor switch control signal PSC to the primary side before it actually turns on the primary-side transistor switch, thus additionally optimizing the dead time and resulting in further improved efficiency.

As would be appreciated by those of ordinary skill in the art, in other embodiments, the first delay circuit 1301 may be arranged at a different location than as shown in FIG. 13, as long as it is allowed to only delay the actual turn-off instant of the secondary-side synchronous rectification transistor but not the turn-off instant of the secondary-side transistor switch indicated by the secondary-side transistor switch control signal SRoff.

Figure 14:
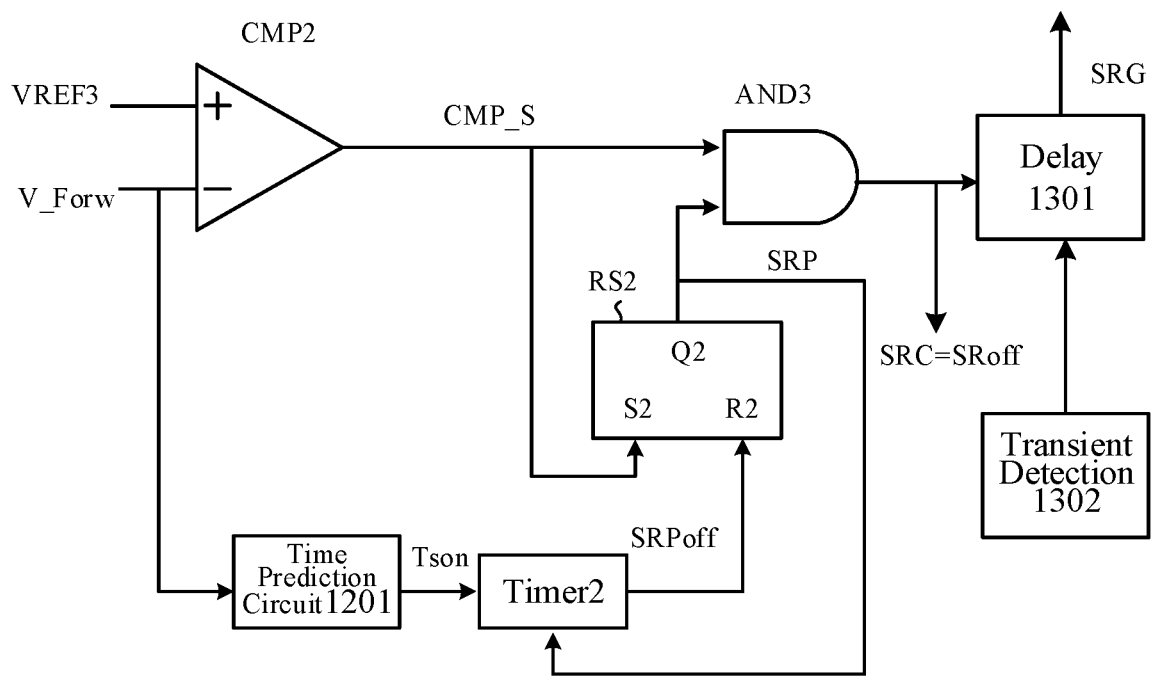
FIG. 14 shows a detailed structural schematic diagram of a control circuit 101 according to yet another embodiment of the present invention.

Further, as shown in FIG. 14, in a further embodiment, the delay created by the first delay circuit 1301 may be adjustable, and the control circuit 101 may further include a transient detection circuit 1302 configure to determine whether a load jump has occurred in the isolated power supply and, if so, output to the first delay circuit 1301 a transient response signal for shortening the delay of the first delay circuit 1301.

In steady-state operation, the actual turn-on instant for the primary-side transistor switch is principally determined by the supposed turn-on instant for the primary-side transistor switch. In this case, the dead time is equal to a difference between the instants indicated respectively in PSC and SRoff plus the delay incurred during the transmission of PSC to the primary side before it finally turns on the primary-side transistor switch minus the delay created by the first delay circuit 1301 and thus has a large safety margin that can be properly modulated for improved efficiency. When a load jump takes place, the primary-side transistor switch may be turned on at an earlier time when compared with the case of steady-state operation. Consequently, the instant indicated in PSC may be substantially equal to that indicated in SRoff. In this situation, continued use of the delay parameters for steady-state operation may aggravate the risk of shoot-through, and shortening the delay created by the first delay circuit 1301 in response to the detected transient response can provide a larger safety margin. As transient response is rarer than steady-state operation, efficiency will not be significantly compromised.

Detection algorithms that can be used in the transient detection circuit 1302 have been described in literature, and a description thereof is omitted herein for the sake of brevity.

Figure 15:
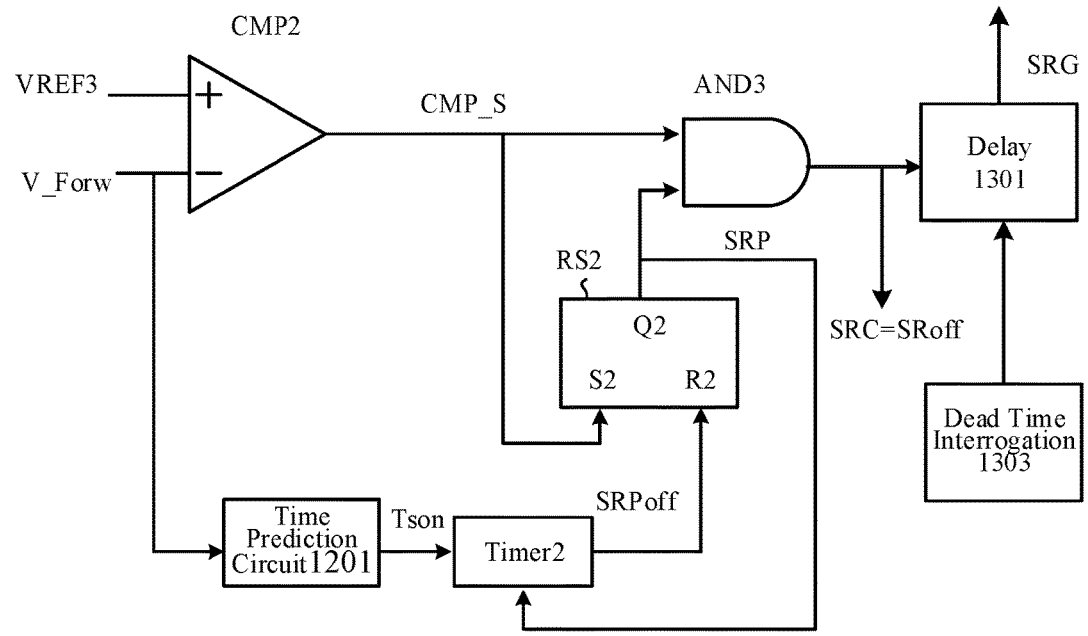
FIG. 15 shows a detailed structural schematic diagram of a control circuit 101 according to still yet another embodiment of the present invention.

FIG. 15 shows a detailed structural schematic diagram of the control circuit 101 according to a further embodiment of the present invention. Compared with the embodiment of FIG. 13 in which the first delay circuit 1301 can provide an adjustable delay, the control circuit further includes a dead time interrogation circuit 1303 configured to calculate a dead time of the previous operational period and compare the calculated value with a dead time reference Tref_D. If the calculated value is less than the dead time reference Tref_D, the dead time interrogation circuit 1303 may reduce the delay provided by the first delay circuit 1301. Otherwise, if the calculated value is greater than the dead time reference Tref_D, the dead time interrogation circuit 1303 may increase the delay provided by the first delay circuit 1301. Such timely response of the dead time interrogation circuit 1303 can ensure that the dead time always lies in a target range, thus achieving maximized efficiency.

There are already available dead time interrogation designs in the art, and therefore further description in this regard is believed unnecessary. Those skilled in the art will appreciate that any dead time interrogation method may be applicable to the embodiment shown in FIG. 15 to achieve the above-described effect.

Figure 16:
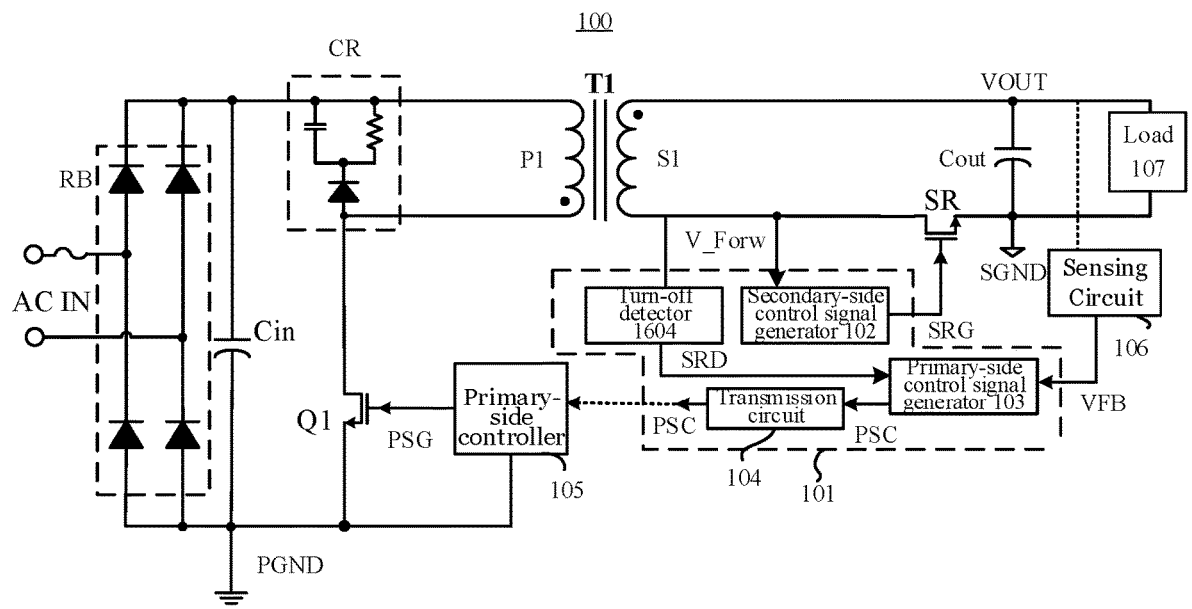
FIG. 16 is a schematic diagram illustrating the architecture of a control circuit 101 according to a further embodiment of the present invention.

FIG. 16 is a schematic diagram illustrating the architecture of the control circuit 101 according to a further embodiment of the present invention. The control circuit 101 shown in FIG. 16 is also applicable to the embodiment shown in FIG. 1. For the sake of brevity and conciseness, the technical features that have been described above in conjunction with the embodiments shown in FIGS. 2 to 15 and can be readily applied by those of ordinary skill in the art to the embodiment of FIG. 16 will not be described again, but they are still considered as part of the disclosure of the present invention. Compared to the embodiment shown in FIG. 2, the secondary-side control signal generator 102 in the embodiment of FIG. 16 receives the voltage signal V_Forw from the secondary-side winding in the isolated power supply and generates the secondary-side synchronous rectification transistor drive signal SRG for turning on or off the secondary-side synchronous rectification transistor. In addition, the control circuit 101 further includes a turn-off detector 1604 for the secondary-side transistor switch, which is connected in the secondary side of the isolated power supply and configured to produce a turn-off acknowledgement signal SRD when the secondary-side synchronous rectification transistor has been turned off. Accordingly, the primary-side control signal generator 103 is configured to receive the turn-off acknowledgement signal SRD and the feedback signal VFB of the isolated power supply's output voltage and responsively generate the primary-side transistor switch control signal PSC indicating the turn-on instant for the primary-side transistor switch. The primary-side control signal generator determines the first turn-on instant K1 based on the turn-off acknowledgement signal SRD and determines the second turn-on instant K2 based on the feedback signal VFB of the isolated power supply's output voltage. The primary-side control signal generator 103 further determines the turn-on instant for the primary-side transistor switch based on the second turn-on instant K2 or the first turn-on instant K1, whichever is later, and responsively generates the primary-side transistor switch control signal PSC.

As there may be a significant delay from the determination of the turn-off instant of the secondary-side synchronous rectification transistor to the generation of the final drive signal, as well as an additional delay incurred during the turn-off of the synchronous rectification transistor by the drive signal, generating the signal SRD indicative of the second turn-on instant K2 based on the confirmed turn-off of the secondary-side synchronous rectification transistor is more reliable and suited to applications requiring extremely high reliability than generating it based on the signal SRoff.

Figure 17A:
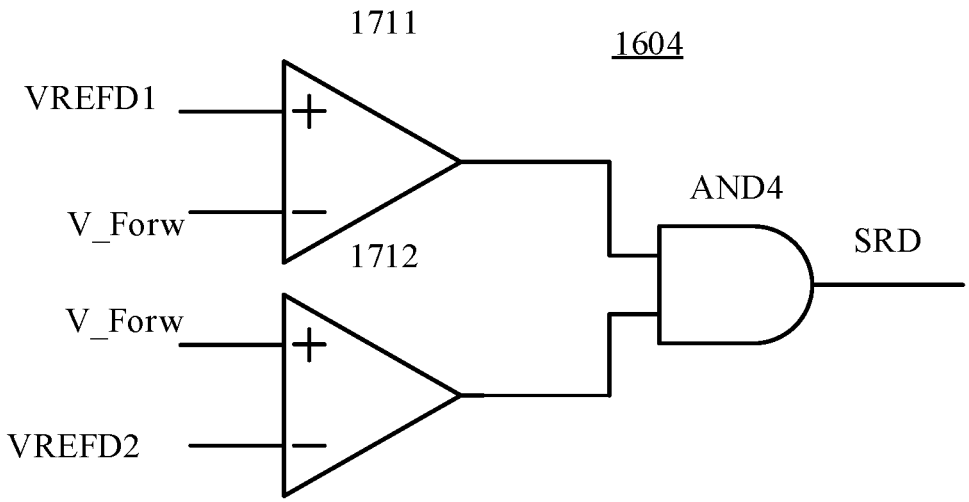
FIG. 17A shows a structural schematic diagram of a turn-off detector 1604 for a secondary-side transistor switch according to an embodiment of the present invention.

As shown in FIG. 17A, in one embodiment, the turn-off detector 1604 for the secondary-side transistor switch may receive the voltage signal V_Forw from the secondary-side winding in the isolated power supply, compare it separately with a first turn-off reference VREFD1 (corresponding to a voltage of the secondary-side winding when the synchronous rectification transistor is turned on during freewheeling) and a second turn-off reference VREFD2 (corresponding to a voltage of the secondary-side winding when a parasitic body diode is turned on after the synchronous rectification transistor is turned off), and provide the comparison results to a logic gate (e.g., an AND gate AND4). The logic gate may perform a logical determination and responsively output the turn-off acknowledgement signal SRD. When detecting a drop of the voltage signal V_Forw from the secondary-side winding from VREFD1 to VREFD2, it is determined that the secondary-side synchronous rectification transistor has been turned off, and the turn-off acknowledgement signal SRD is responsively generated.

Figure 17B:
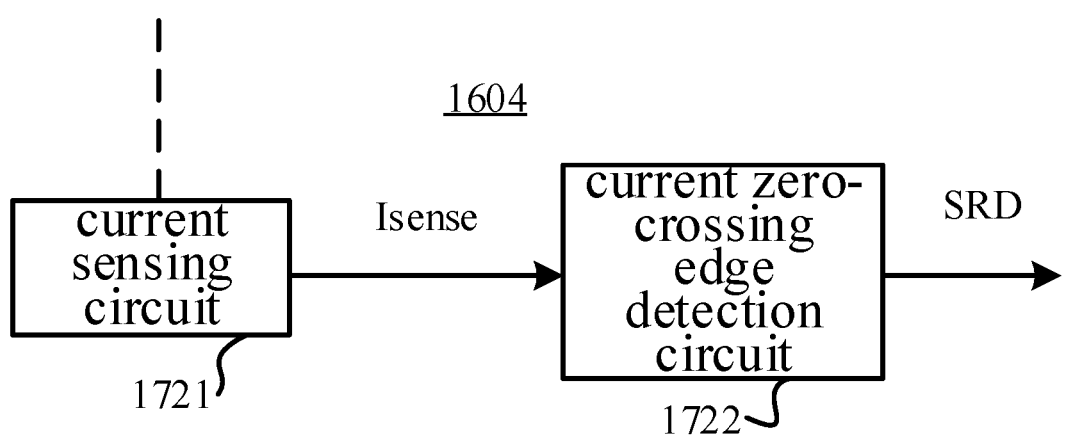
FIG. 17B shows a structural schematic diagram of a turn-off detector 1604 for the secondary-side transistor switch according to another embodiment of the present invention.

As shown in FIG. 17B, in another embodiment, the turn-off detector 1604 for the secondary-side transistor switch may further include: a current sensing circuit 1721 configured to sense a current flowing through the secondary-side synchronous rectification transistor SR and output a sensed current signal Isense characterizing the current; and a current zero-crossing edge detection circuit 1722 configured to receive the sensed current signal Isense. If the sensed current signal Isense indicates the arrival of a zero-crossing falling edge of the current through the secondary-side synchronous rectification transistor SR, it is determined that the secondary-side synchronous rectification transistor SR has been turned off, and the turn-off acknowledgement signal SRD is responsively generated.

As would be appreciated by those of ordinary skill in the art, the turn-off detection of the secondary-side synchronous rectification transistor and the structure of the turn-off detector 1604 for the secondary-side transistor switch are not limited to those described in the two embodiments of FIGS. 17A and 17B, and these embodiments are exemplary rather than limiting in nature. In other embodiments, any other circuit suited to turn-off detection of the secondary-side synchronous rectification transistor SR may be used as the turn-off detector 1604 for the secondary-side transistor switch, without departing from the scope of the present invention as defined by the appended claims.

Figure 18:
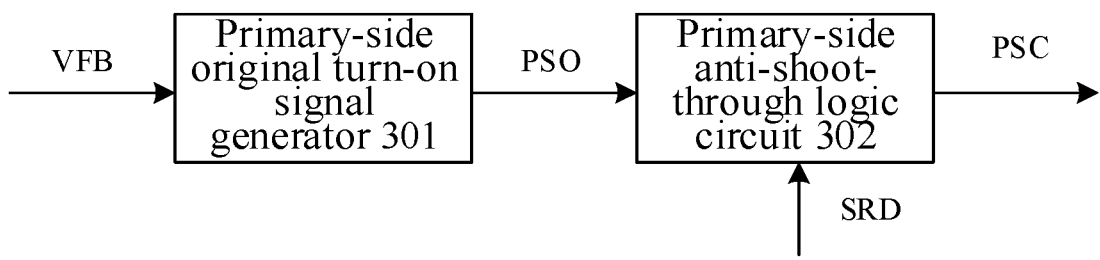
FIG. 18 shows a structural schematic diagram of a primary-side control signal generator 103 for use in the control circuit 101 of FIG. 16 according to an embodiment of the present invention.

FIG. 18 shows a structural schematic diagram of the primary-side control signal generator 103 for use in the control circuit 101 of FIG. 16 according to an embodiment of the present invention. Differing from the embodiment of FIG. 3, the anti-shoot-through logic circuit receives the primary-side original turn-on instant signal PRO and the turn-off acknowledgement signal SRD, and the turn-off instant of the secondary-side synchronous rectification transistor indicated in the turn-off acknowledgement signal is taken as the second turn-on instant K2. Accordingly, when the first turn-on instant K1 is earlier than the second turn-on instant K2, the primary-side transistor switch control signal PSC is generated based on the turn-off acknowledgement signal SRD so that the turn-on instant for the primary-side transistor switch is not earlier than the second turn-on instant K2.

Figure 19:
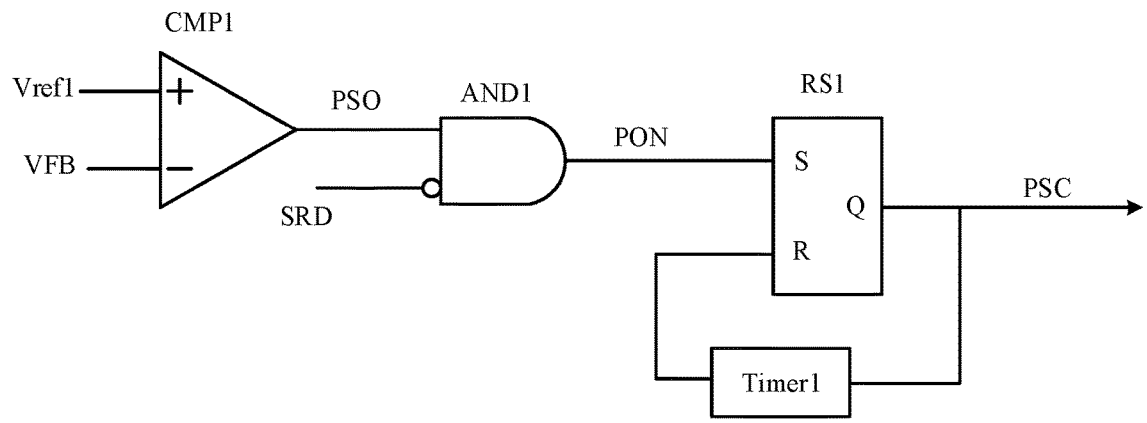
FIG. 19 shows a detailed view of the structure of a primary-side control signal generator 103 according to a corresponding embodiment.

FIG. 19 shows a detailed view of the structure of the primary-side control signal generator 103 according to a corresponding embodiment, in which the turn-off acknowledgement signal SRD is an electrical level signal. This embodiment differs from the embodiment shown in FIG. 4 in that the first AND gate AND1 serving as the first logic gate receive, respectively at this inputs, the primary-side original turn-on instant signal PSO and the turn-off acknowledgement signal SRD and outputs the primary-side transistor switch turn-on instant signal PON containing information on the turn-on instant for the primary-side transistor switch.

Figure 20:
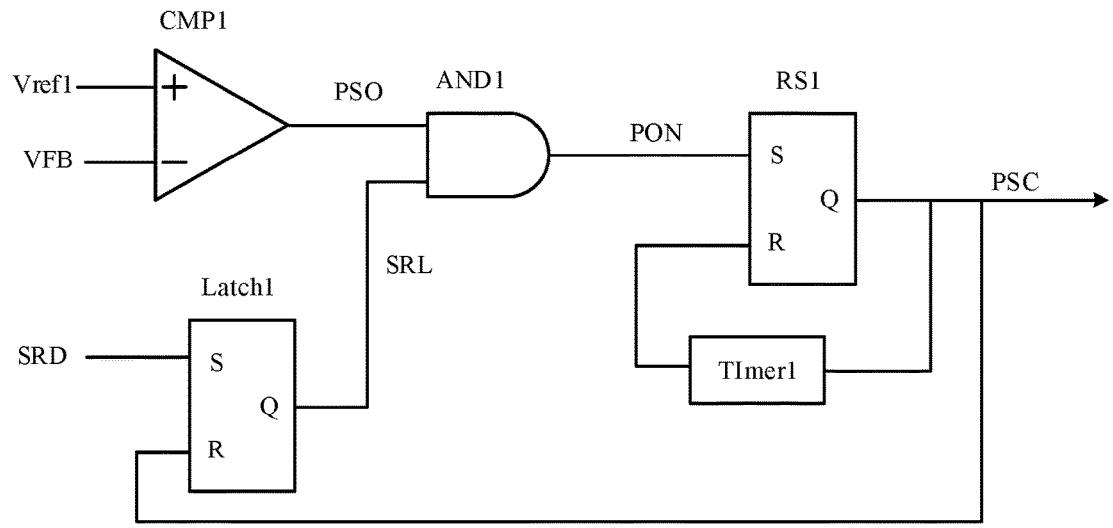
FIG. 20 shows a detailed view of the structure of a primary-side control signal generator 103 according to another corresponding embodiment.

FIG. 20 shows a detailed view of the structure of the primary-side control signal generator 103 according to another corresponding embodiment, in which the turn-off acknowledgement signal SRD is a pulse signal. This embodiment differs from the embodiment shown in FIG. 6 in that the latch in the anti-shoot-through logic circuit 402 receives and latches the turn-off acknowledgement signal SRD and outputs the latched signal Latch.

Figure 21:
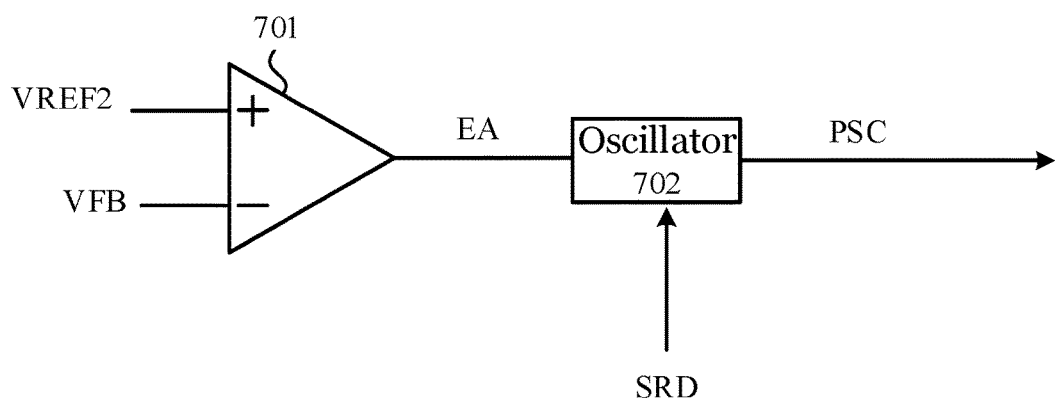
FIG. 21 shows a structural schematic diagram of a primary-side control signal generator 103 according to a further corresponding embodiment of the present invention.

FIG. 21 shows a structural schematic diagram of the primary-side control signal generator 103 according to a further embodiment of the present invention. This embodiment differs from the embodiment shown in FIG. 7 in that in the primary-side control signal generator 103, the turn-off acknowledgement signal SRD may be asserted to enable the primary-side control signal generator 103 or not, and first turn-on instant K1 may be a time instant when the turn-off acknowledgement signal SRD is asserted to enable the primary-side control signal generator 103.

Specifically, the primary-side control signal generator 103 shown in FIG. 21 differs from the embodiment shown in FIG. 7 mainly in that the turn-off acknowledgement signal SRD is asserted to enable the oscillator. When the oscillator 702 determines that the edge of the square wave signal is supposed to arrive based on the current frequency, but the turn-off acknowledgement signal SRD has not been asserted yet, the oscillator 702 may delay the rising or falling edge of the square wave signal to a time instant not earlier than the instant when the turn-off acknowledgement signal SRD is asserted.

Figure 22:
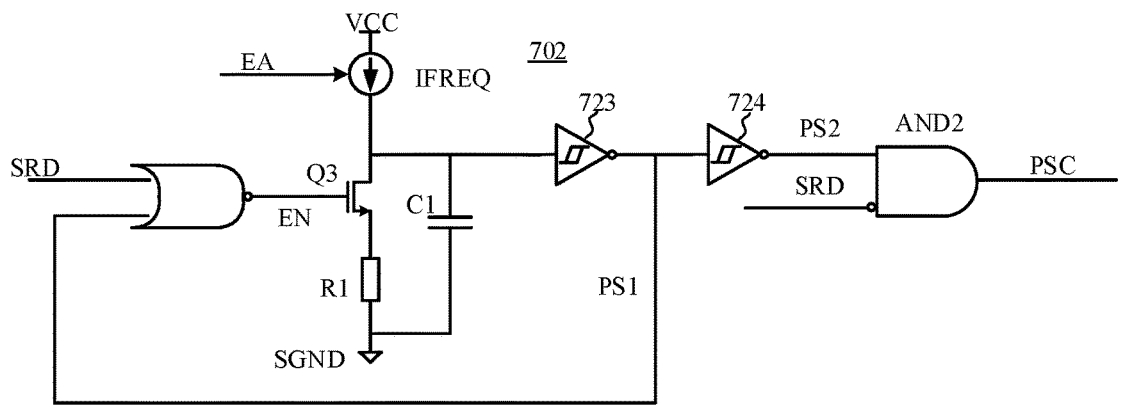
FIG. 22 shows a structural schematic diagram of an oscillator 702 for use in the primary-side control signal generator 103 of FIG. 21.

In one embodiment, the oscillator 702 may determine a supposed time instant of arrival of the edge of the square wave signal based on the current frequency as the first turn-on instant K1, and check whether the enable signal EN is asserted in response of the arrival of the first turn-on instant K1. FIG. 22 shows a structural schematic diagram of the oscillator 702 suitable for use in the primary-side control signal generator 103 of FIG. 21. This differs from the embodiment shown in FIG. 8 mainly in that the enable NOR gate receives the turn-off acknowledgement signal SRD at its first input, is connected to the output of the first hysteresis inverter at the second input, and provides the enable signal EN at the output. Moreover, the second AND gate AND2 is connected to the output of the second hysteresis inverter 724 at its first input, receives an inverted version of the turn-off acknowledgement signal SRD at the second input, and provides the primary-side transistor switch control signal PSC at the output.

Figure 23:
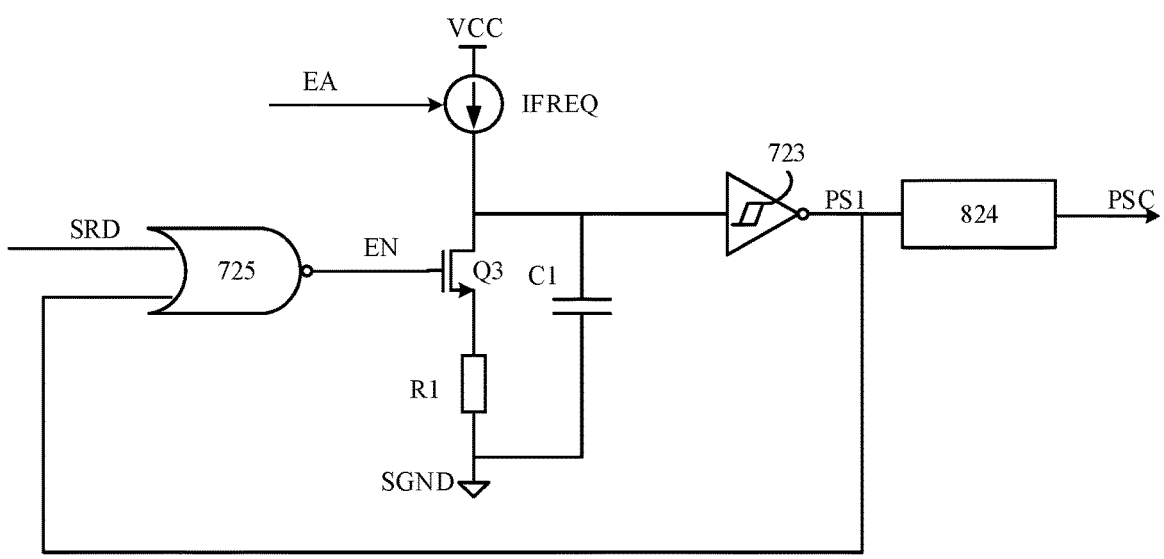
FIG. 23 shows a structural schematic diagram of another oscillator 702 for use in the primary-side control signal generator 103 of FIG. 21.

In another embodiment, the oscillator 702 may determine a supposed time instant of arrival of the edge of the square wave signal based on the current frequency as the first turn-on instant K1, and check whether the enable signal EN is asserted at an instant prior to the first turn-on instant K1. FIG. 23 shows another structural schematic diagram of the oscillator 702 suitable for use in the primary-side control signal generator 103 of FIG. 21. This differs from the embodiment shown in FIG. 10 mainly in that the enable NOR gate receives the turn-off acknowledgement signal SRD at its first input, is connected to the output of the first hysteresis inverter 723 at the second input, and provides the enable signal EN at the output.

Using the turn-off acknowledgement signal SRD allows the secondary-side control signal generator 102 to focus on the generation of the secondary-side synchronous rectification transistor drive signal SRG. For example, in a COT control mode, the secondary-side control signal generator 102 may similarly receive the voltage signal V_Forw from the secondary-side winding, and if the voltage signal V_Forw from the secondary-side winding is equal to the third reference REF3, indicate the arrival of the turn-on instant for the secondary-side synchronous rectification transistor SR and start counting down the first predetermined period of time Tson. After the elapse of the first predetermined period of time Tson, it may indicate the turn-off instant of the secondary-side synchronous rectification transistor, and generate the secondary-side synchronous rectification transistor drive signal SRG based on the turn-on and turn-off instants of the secondary-side synchronous rectification transistor.

The secondary-side control signal generator may directly employ the structure according to the embodiment shown in FIG. 12 and, in this case, is suitable for use in the control circuit 101 shown in FIG. 16. In this case, the output signal of the second comparator CMP2 or the second flip-flop RS2 may contain information on the turn-on instant for the secondary-side synchronous rectification transistor and be used to start a timer. The final secondary-side synchronous rectification transistor drive signal may be output from the third AND gate AND3, or from the second flip-flop RS2 in absence of the third AND gate AND3.

Likewise, the secondary-side control signal generator may directly employ the structure according to the embodiment shown in FIG. 15 and, in this case, is suitable for use in the control circuit 101 shown in FIG. 16. The synchronous rectification time prediction circuit additionally included in the embodiment of FIG. 15 has been described above, and a repeated description thereof is omitted here.

Figure 24:
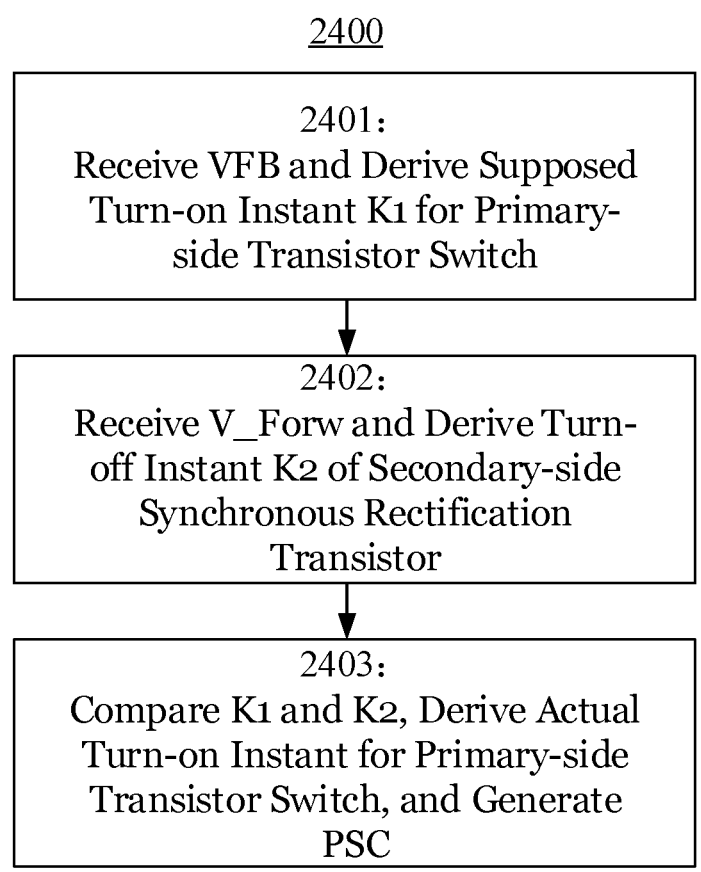
FIG. 24 shows a flowchart of an isolated power supply control method 2400 according to embodiments of the present invention.

FIG. 24 shows a flowchart of a method 2400 for control of the isolated power supply according to embodiments of the present invention, including the steps of:

2401) receiving the feedback signal VFB of the output voltage of the isolated power supply 100 and deriving a supposed turn-on instant K1 for the primary-side transistor switch from the output voltage feedback signal VFB;

2402) receiving the voltage signal V_Forw from the secondary-side winding in the isolated power supply 100 and deriving a turn-off instant K2 of the secondary-side synchronous rectification transistor; and 2403) deriving an actual turn-on instant for the primary-side transistor switch from the supposed turn-on instant K1 for the primary-side transistor switch and the turn-off instant K2 of the secondary-side synchronous rectification transistor and responsively generating a primary-side transistor switch control signal PSC.

When the supposed turn-on instant K1 for the primary-side transistor switch is later than the turn-off instant K2 of the secondary-side synchronous rectification transistor, the actual turn-on instant for the primary-side transistor switch corresponds to the supposed turn-on instant K1. When the supposed turn-on instant K1 for the primary-side transistor switch is earlier than the turn-off instant K2 of the secondary-side synchronous rectification transistor, the actual turn-on instant for the primary-side transistor switch is delayed to an instant not earlier than the turn-off instant K2 of the secondary-side synchronous rectification transistor.

The above description of the method and the steps thereof according to the embodiment of the present invention is merely illustrative and is not intended to limit the invention in any sense. Additionally, some well-known control steps and control parameters used therein are not described or not described in detail so as to make the description of the present invention clear, concise and easy to understand. Those skilled in the art to which the present invention pertains would appreciate that the numbering of the steps as used in the above description of the method and the steps thereof according to the various embodiment of the present invention is not intended to indicate a mandatory sequential order of the steps. These steps are not limited to being carried out in the order as numbered, because they may also be carried out in a different order, or two or more of them may be carried out in parallel.

Although the present invention has been described with reference to several exemplary embodiments, it is to be understood that the terminology used is intended to be in the nature of description and exemplification rather than of limitation. As the present invention can be embodied in various specific forms without departing from the spirit or essential characteristics thereof, it is to be understood that the foregoing embodiments are not limited to the above disclosed details but should be broadly interpreted within the spirit and scope as defined by the appended claims. Accordingly, any and all changes and modifications that come within the scope of the appended claims and equivalents thereof are all intended to be embraced therein.

What is claimed is:

1. A control circuit for an isolated power supply, the control circuit comprising:
   a secondary-side drive signal generator configured to receive a signal characterizing a voltage of a secondary-side winding in the isolated power supply and generate a secondary-side transistor switch drive signal for turning on or off a secondary-side synchronous rectification transistor;
   a secondary-side transistor switch turn-off detector connected in a secondary side of the isolated power supply, the secondary-side transistor switch turn-off detector configured to produce a turn-off acknowledgement signal upon the secondary-side synchronous rectification transistor being turned off; and
   a primary-side control signal generator configured to receive the turn-off acknowledgement signal and a feedback signal of an output voltage of the isolated power supply and responsively generate a primary-side transistor switch control signal indicating a turn-on instant for a primary-side transistor switch,
   wherein the primary-side control signal generator is configured to:
   determine a second turn-on instant referring to an turn-off instant of the secondary-side synchronous rectification transistor from the turn-off acknowledgement signal;

determine a first turn-on instant referring to a supposed turn-on instant for the primary-side transistor switch from the feedback signal of the output voltage of the isolated power supply; and determine the turn-on instant for the primary-side transistor switch from the second turn-on instant or the first turn-on instant whichever is later, and responsively generate the primary-side transistor switch control signal.

2. The control circuit of claim 1, wherein the control circuit is a secondary-side controller of the isolated power supply included in the secondary side of the isolated power supply.

3. The control circuit of claim 1, further comprising a primary-side control signal transmitter configured to receive and modulate the primary-side transistor switch control signal and transmit the modulated signal from the secondary side to a primary side of the isolated power supply.

4. The control circuit of claim 1, wherein the primary-side transistor switch control signal further contains information about a turn-off instant of the primary-side transistor switch for turning off the primary-side transistor switch.

5. The control circuit of claim 1, wherein the secondary-side transistor switch turn-off detector is configured to receive the signal characterizing the voltage of the secondary-side winding in the isolated power supply, compare the signal characterizing the voltage of the secondary-side winding respectively with a first turn-off reference corresponding to a turn-on voltage drop of the synchronous rectification transistor and a second turn-off reference corresponding to a voltage drop across a parasitic body diode occurring once the synchronous rectification transistor is turned off, perform a logical determination on the comparison results using a logic gate, and responsively output the turn-off acknowledgement signal, and wherein when a drop of the signal characterizing the voltage of the secondary-side winding from the first turn-off reference to the second turn-off reference, the secondary-side transistor switch turn-off detector determines that the secondary-side synchronous rectification transistor has been turned off, and the turn-off acknowledgement signal is responsively produced.

6. The control circuit of claim 1, wherein the secondary-side transistor switch turn-off detector comprise: a current sensing circuit configured to sense a current flowing through the secondary-side synchronous rectification transistor and output a sensed current signal characterizing the current; and a current zero-crossing edge detection circuit configured to receive the sensed current signal and, if the sensed current signal indicates a zero-crossing of the current through the secondary-side synchronous rectification transistor, determines that the secondary-side synchronous rectification transistor has been turned off and responsively produce the turn-off acknowledgement signal.

7. The control circuit of claim 1, wherein the primary-side control signal generator comprises:
a primary-side original turn-on signal generator configured to receive the feedback signal of the output voltage of the isolated power supply and generate a primary-side original turn-on signal indicating a supposed turn-on instant for the primary-side transistor switch as the first turn-on instant; and
an anti-shoot-through logic circuit configured to receive the primary-side original turn-on signal and the turn-off acknowledgement signal, wherein the turn-off instant of the secondary-side synchronous rectification transistor indicated in the turn-off acknowledgement signal is taken as the second turn-on instant, and if the second turn-on instant is later than the first turn-on instant, the primary-side transistor switch control signal is generated from the secondary-side transistor switch control signal so that the turn-on instant for the primary-side transistor switch in a current period is not earlier than the second turn-on instant.

8. The control circuit of claim 7, wherein the turn-off acknowledgement signal is an electrical level signal, and wherein the anti-shoot-through logic circuit comprises a first logic circuit configured to receive both the primary-side original turn-on signal and the turn-off acknowledgement signal and, if the primary-side original turn-on signal indicates to turn on the primary-side transistor switch and the turn-off acknowledgement signal indicates that the secondary-side synchronous rectification transistor has been turned off, output a turn-on instant signal of the primary-side transistor switch indicating the arrival of the turn-on instant for the primary-side transistor switch.

9. The control circuit of claim 7, wherein the turn-off acknowledgement signal is a pulse signal, and wherein the anti-shoot-through logic circuit comprises:
a first latch configured to receive and latch the turn-off acknowledgement signal and output the latched signal; and
a first logic gate configured to receive both the primary-side original turn-on signal and the latched signal and, if the primary-side original turn-on signal indicates to turn on the primary-side transistor switch and the latched signal indicates the arrival of the turn-off instant of the secondary-side synchronous rectification transistor, output a turn-on instant signal of the primary-side transistor switch indicating the arrival of the turn-on instant for the primary-side transistor switch.

10. The control circuit of claim 1, wherein in the primary-side control signal generator, the turn-off acknowledgement signal is configured to be asserted to enable the primary-side control signal generator, and wherein the first turn-on instant is a time instant when the turn-off acknowledgement signal is asserted to enable the primary-side control signal generator, the primary-side control signal generator comprising:
a first error amplifier configured to amplify a difference between the feedback signal of the output voltage of the isolated power supply and a second reference and output an amplified error signal; and
an oscillator configured to receive both the amplified error signal and the turn-off acknowledgement signal and generate a square wave signal as the primary-side transistor switch control signal, wherein a frequency of the square wave signal is determined by the amplified error signal, wherein a rising or falling edge of the square wave signal indicates a turn-on instant for the primary-side transistor switch for a next period and is output when the turn-off acknowledgement signal is detected as being asserted, and wherein when the oscillator determines based on a currently set frequency that the rising or falling edge of the square wave signal is supposed to arrive but the turn-off acknowledgement signal has not been asserted yet, the oscillator delays the rising or falling edge of the square wave signal to a time instant not earlier than the instant when the turn-off acknowledgement signal is asserted.

11. The control circuit of claim 10, wherein the oscillator considers the supposed instant of arrival of the rising or falling edge of the square wave signal as the first turn-on instant based on the currently set frequency, and checks whether the turn-off acknowledgement signal is asserted in response of the arrival of the first turn-on instant, the oscillator comprising:
- a frequency setting current source configured to generate a frequency setting current based on the amplified error signal;
- a frequency setting capacitor comprising a first terminal for receiving the frequency setting current and a second terminal connected to a reference ground;
- a discharge branch connected in parallel with the frequency setting capacitor, the discharge branch controlled by an enable signal to start or stop discharging, the discharge branch making up a discharge loop with a capacitive time constant together with the frequency setting capacitor;
- a first hysteresis inverter comprising an input connected to the first terminal of the frequency setting capacitor;
- a second inverter comprising an input connected to an output of the first hysteresis inverter;
- an enable NOR gate comprising a first input for receiving the turn-off acknowledgement signal, a second input connected to the output of the first hysteresis inverter and an output for presenting the enable signal; and
- a second AND gate comprising a first input connected to an output of the second hysteresis inverter, a second input for receiving an inverted version of the turn-off acknowledgement signal and an output for presenting the primary-side transistor switch control signal.

12. The control circuit of claim 10, wherein the oscillator considers the supposed instant of arrival of the rising or falling edge of the square wave signal as the first turn-on instant based on the currently set frequency, and checks whether the turn-off acknowledgement signal is asserted at an instant prior to the first turn-on instant, the oscillator comprising:
- a frequency setting current source configured to generate a frequency setting current based on the amplified error signal;
- a frequency setting capacitor comprising a first terminal for receiving the frequency setting current and a second terminal connected to a reference ground;
- a discharge branch connected in parallel with the frequency setting capacitor, the discharge branch controlled by an enable signal to start or stop discharging, the discharge branch making up a discharge loop with a capacitive time constant together with the frequency setting capacitor;
- a first hysteresis inverter comprising an input connected to the first terminal of the frequency setting capacitor;
- an edge detection circuit comprising an input connected to an output of the first hysteresis inverter and an output for providing the primary-side transistor switch control signal; and
- an enable NOR gate comprising a first input for receiving the turn-off acknowledgement signal, a second input connected to the output of the first hysteresis inverter and an output for presenting the enable signal.

13. The control circuit of claim 1, wherein the secondary-side control signal generator generates the secondary-side transistor switch drive signal in different manners in a discontinuous inductor current mode and a continuous inductor current mode, and wherein in the discontinuous inductor current mode, the secondary-side drive signal generator generates the secondary-side transistor switch drive signal indicating the turn-off instant of the secondary-side synchronous rectification transistor at latest upon the start of a zero-current interval of the secondary side of the isolated power supply.

14. The control circuit of claim 1, wherein the secondary-side drive signal generator receives the signal characterizing the voltage of the secondary-side winding, turns on the secondary-side synchronous rectification transistor and starts a timer if the signal characterizing the voltage of the secondary-side winding is equal to a third reference, generates the secondary-side transistor switch drive signal indicating the turn-off instant of the secondary-side synchronous rectification transistor after a first predetermined time, and generate the secondary-side synchronous rectification transistor drive signal based on the turn-on and turn-off instants for the secondary-side synchronous rectification transistor.

* * * * *